United States Patent [19]

Tanaka et al.

[11] Patent Number: 4,730,843
[45] Date of Patent: Mar. 15, 1988

[54] VEHICLE SUSPENSION APPARATUS

[75] Inventors: Tadao Tanaka, Okazaki; Sunao Chikamori, Nagoya; Mitsuhiko Harara; Shinichi Takeuchi, both of Okazaki; Masanaga Suzumura, Nagoya; Minoru Tatemoto, Okazaki; Naotake Kumagai, Aichi; Hiroki Abe, Okazaki, all of Japan

[73] Assignee: Mitsubishi Jidosha Kogyo Kabushiki Kaisha, Tokyo, Japan

[21] Appl. No.: 694,666

[22] Filed: Jan. 24, 1985

[30] Foreign Application Priority Data

| Jan. 24, 1984 | [JP] | Japan | 59-7194[U] |
| Jan. 24, 1984 | [JP] | Japan | 59-7195[U] |
| Jan. 24, 1984 | [JP] | Japan | 59-7196[U] |
| Jan. 24, 1984 | [JP] | Japan | 59-7200[U] |
| Jan. 24, 1984 | [JP] | Japan | 59-7203[U] |
| Jan. 24, 1984 | [JP] | Japan | 59-7206[U] |
| Jan. 24, 1984 | [JP] | Japan | 59-7209[U] |
| Jan. 24, 1984 | [JP] | Japan | 59-7218[U] |
| Jan. 24, 1984 | [JP] | Japan | 59-7220[U] |
| Jan. 24, 1984 | [JP] | Japan | 59-7222[U] |
| Jan. 24, 1984 | [JP] | Japan | 59-7224[U] |
| Mar. 22, 1984 | [JP] | Japan | 59-39916[U] |
| Mar. 22, 1984 | [JP] | Japan | 59-39919[U] |
| Mar. 22, 1984 | [JP] | Japan | 59-39920[U] |

[51] Int. Cl.$^4$ ............................................. B60G 17/04
[52] U.S. Cl. .................................. 280/689; 280/707
[58] Field of Search ............ 280/707, 703, 689, 772; 364/424; 180/79.1, 142, 143

[56] References Cited

U.S. PATENT DOCUMENTS

| 3,608,925 | 9/1971 | Murphy | 280/707 |
| 3,831,969 | 8/1974 | Lindblom | 280/707 |
| 4,216,977 | 8/1980 | Fujii | 280/707 |
| 4,345,661 | 8/1982 | Nishikawa | 280/772 |
| 4,462,610 | 7/1984 | Saito et al. | 280/707 |
| 4,555,126 | 11/1985 | Ishimitsu et al. | 280/703 |
| 4,621,832 | 11/1986 | Nakashima et al. | 280/707 |

FOREIGN PATENT DOCUMENTS

| 89512 | 9/1983 | European Pat. Off. | 180/143 |
| 0106697 | 4/1984 | European Pat. Off. | |
| 2217450 | 10/1973 | Fed. Rep. of Germany | 180/282 |
| 2844413 | 4/1980 | Fed. Rep. of Germany | |
| 2427923 | 5/1979 | France | |
| 5326021 | 8/1976 | Japan | |
| 182505 | 11/1982 | Japan | 280/772 |
| 1335758 | 10/1973 | United Kingdom | |

Primary Examiner—John J. Love
Assistant Examiner—Eric Culbreth
Attorney, Agent, or Firm—Birch, Stewart, Kolasch & Birch

[57] ABSTRACT

Wheel suspension units each having fluid spring chambers are arranged in a vehicle suspension apparatus. A roll control quantity determined in accordance with the relationship between a vehicle velocity and a steering angular velocity, i.e., inlet solenoid valves and exhaust solenoid valves, are controlled in accordance with a solenoid ON/OFF time, thereby controlling the roll of a vehicle.

4 Claims, 40 Drawing Figures

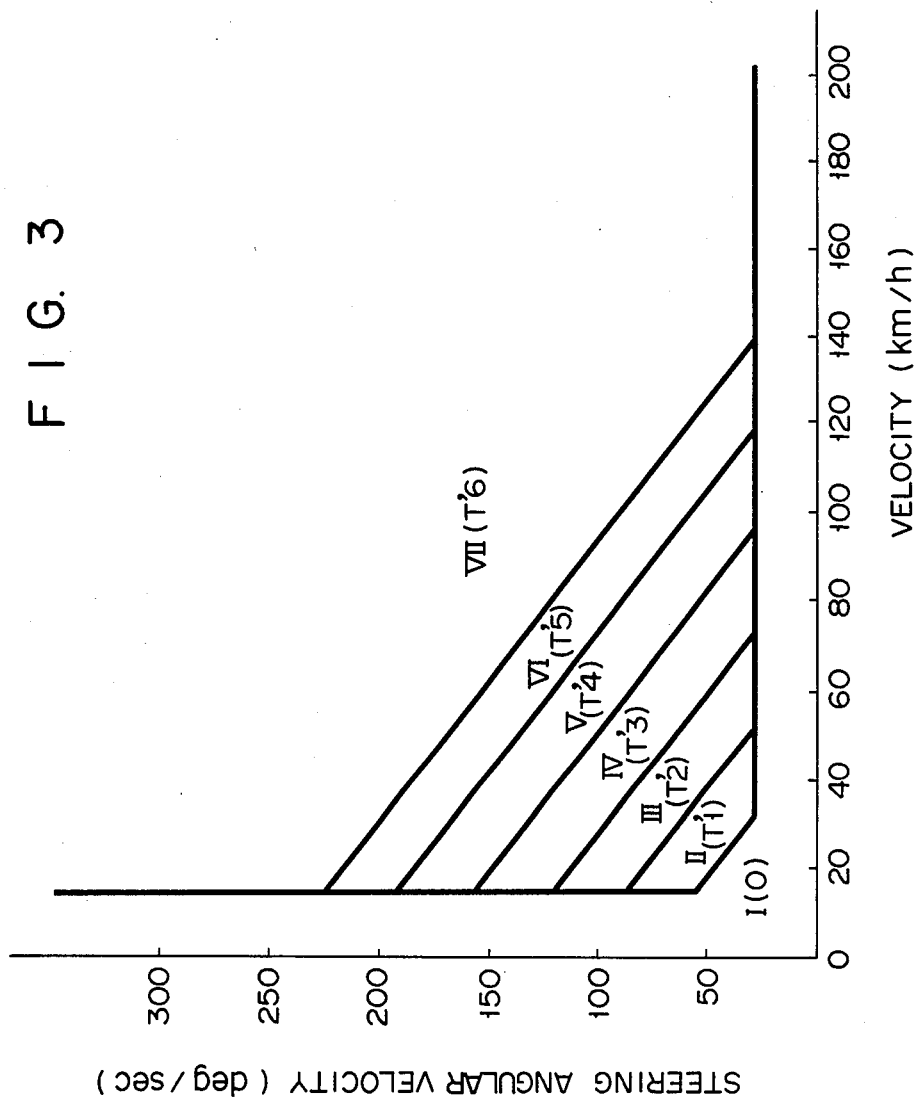

F I G. 16A
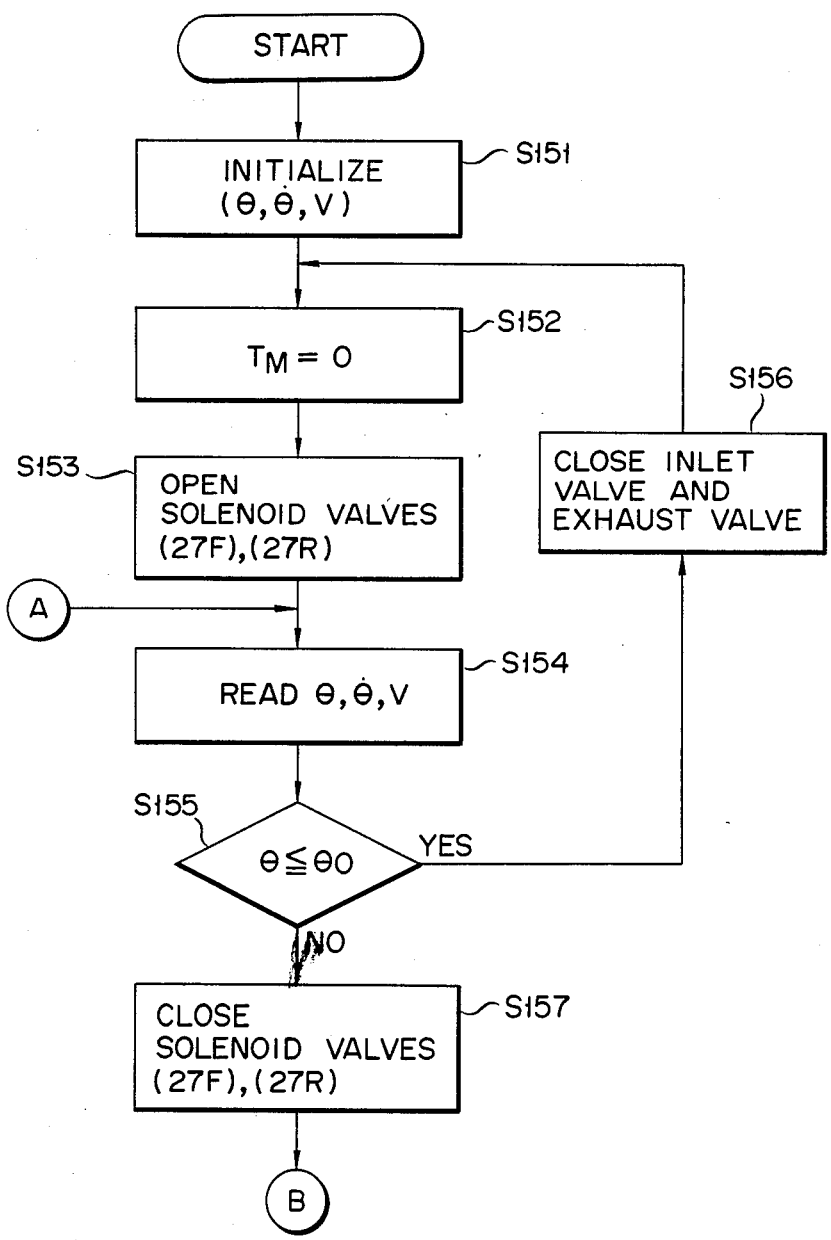

F I G. 16B
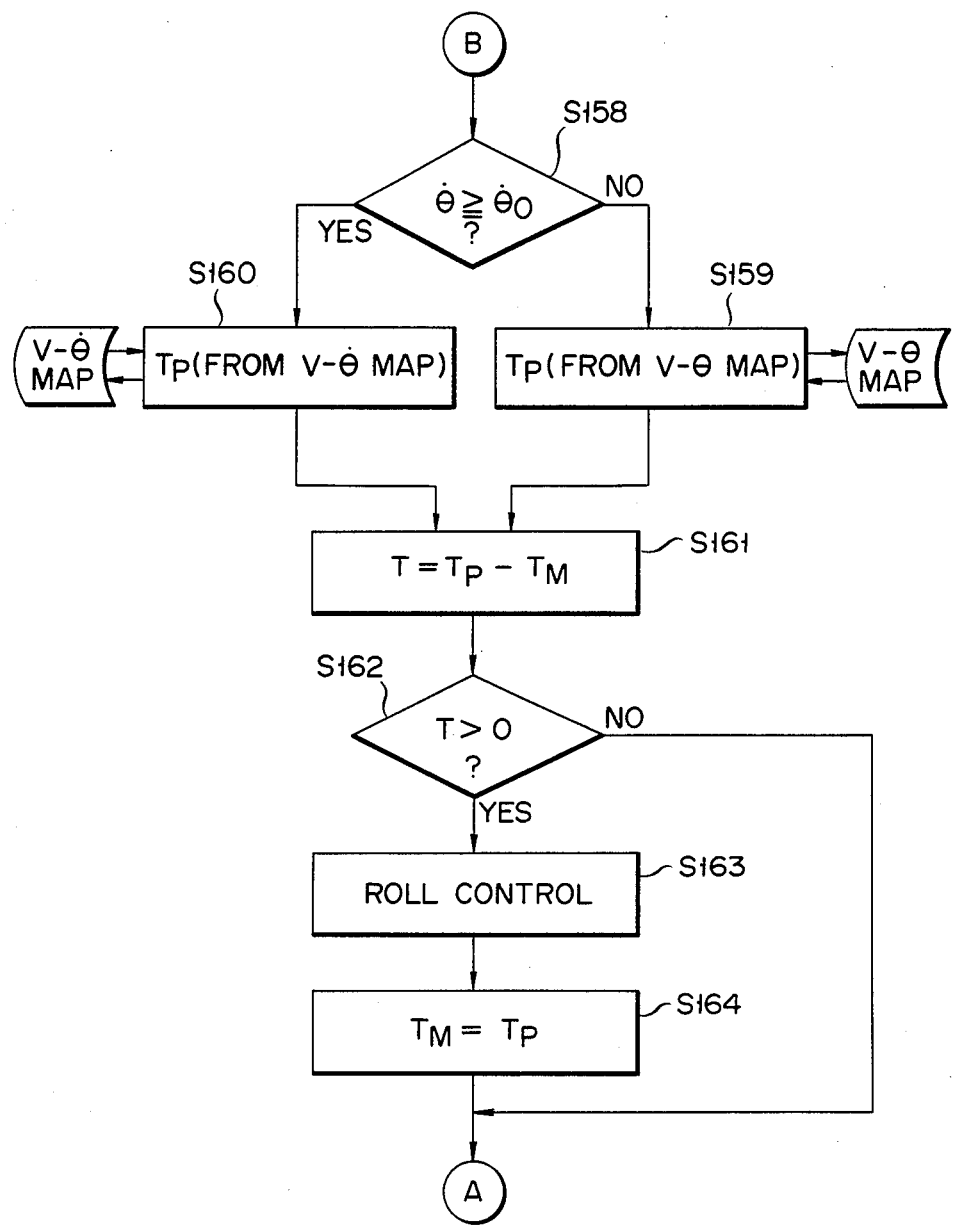

F I G. 17A
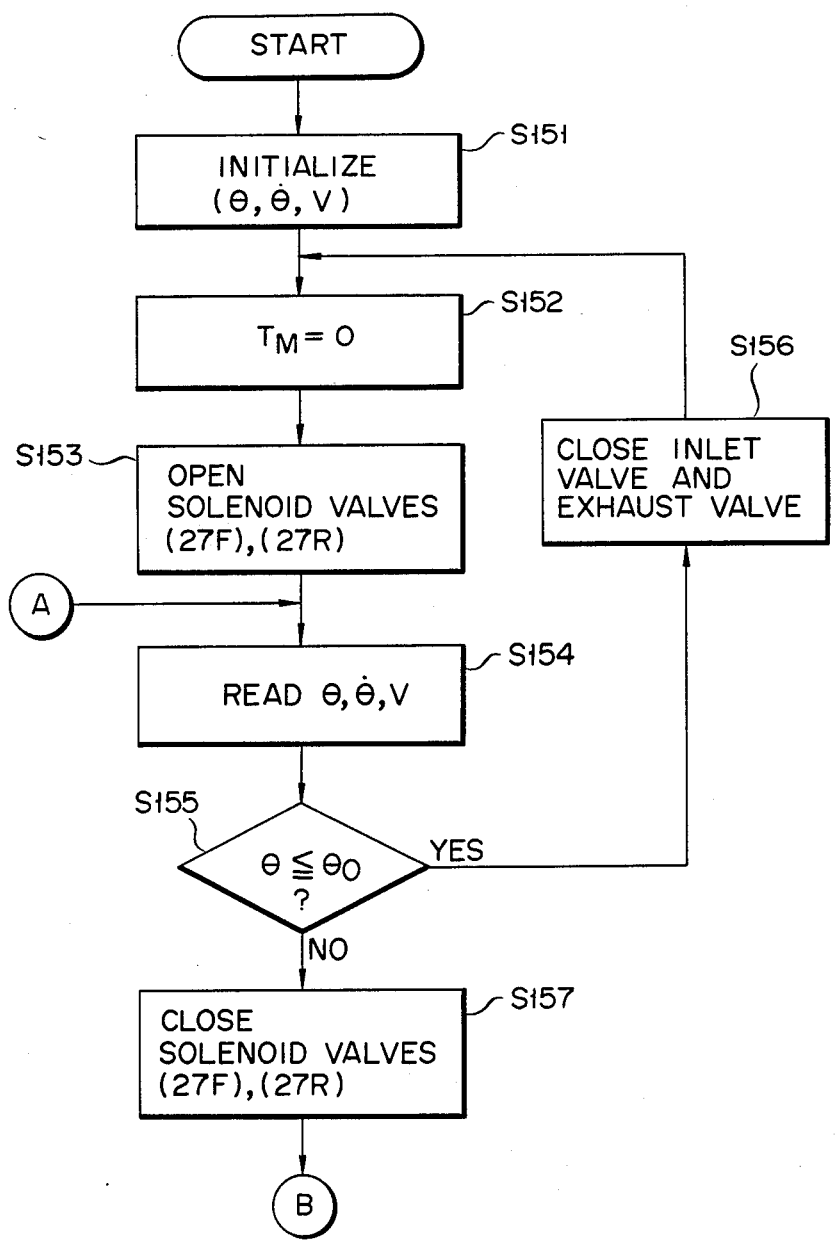

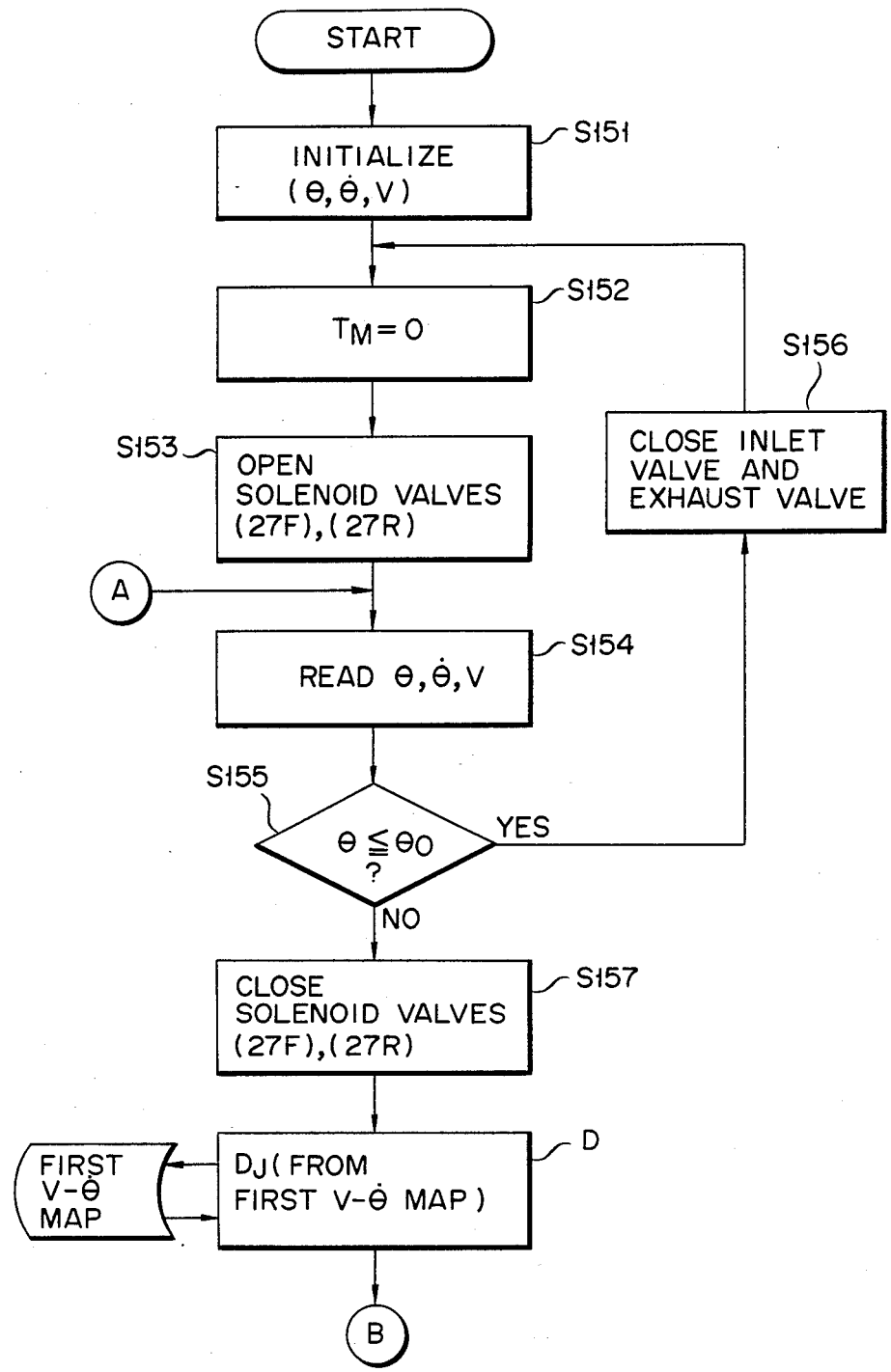

F I G. 18B
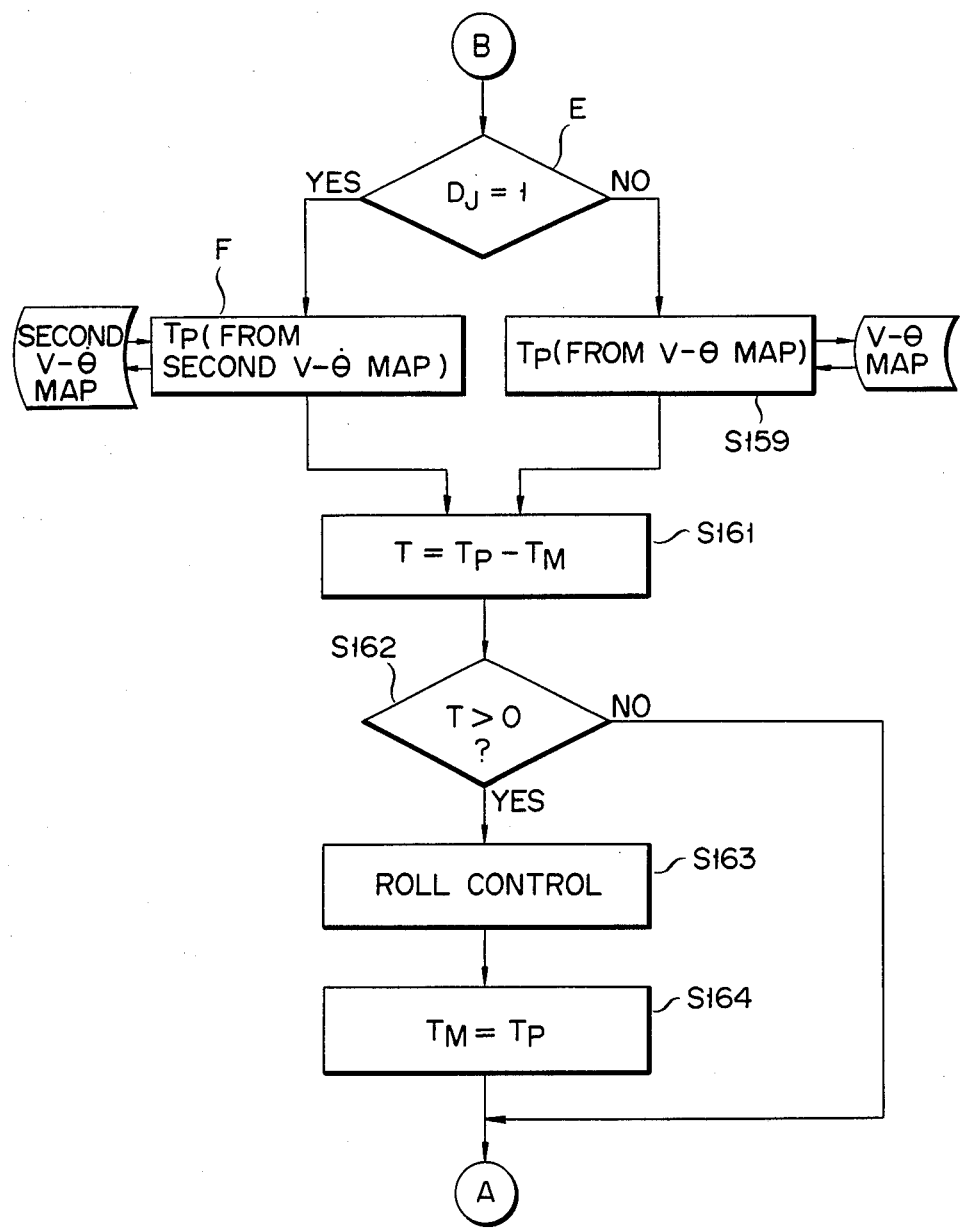

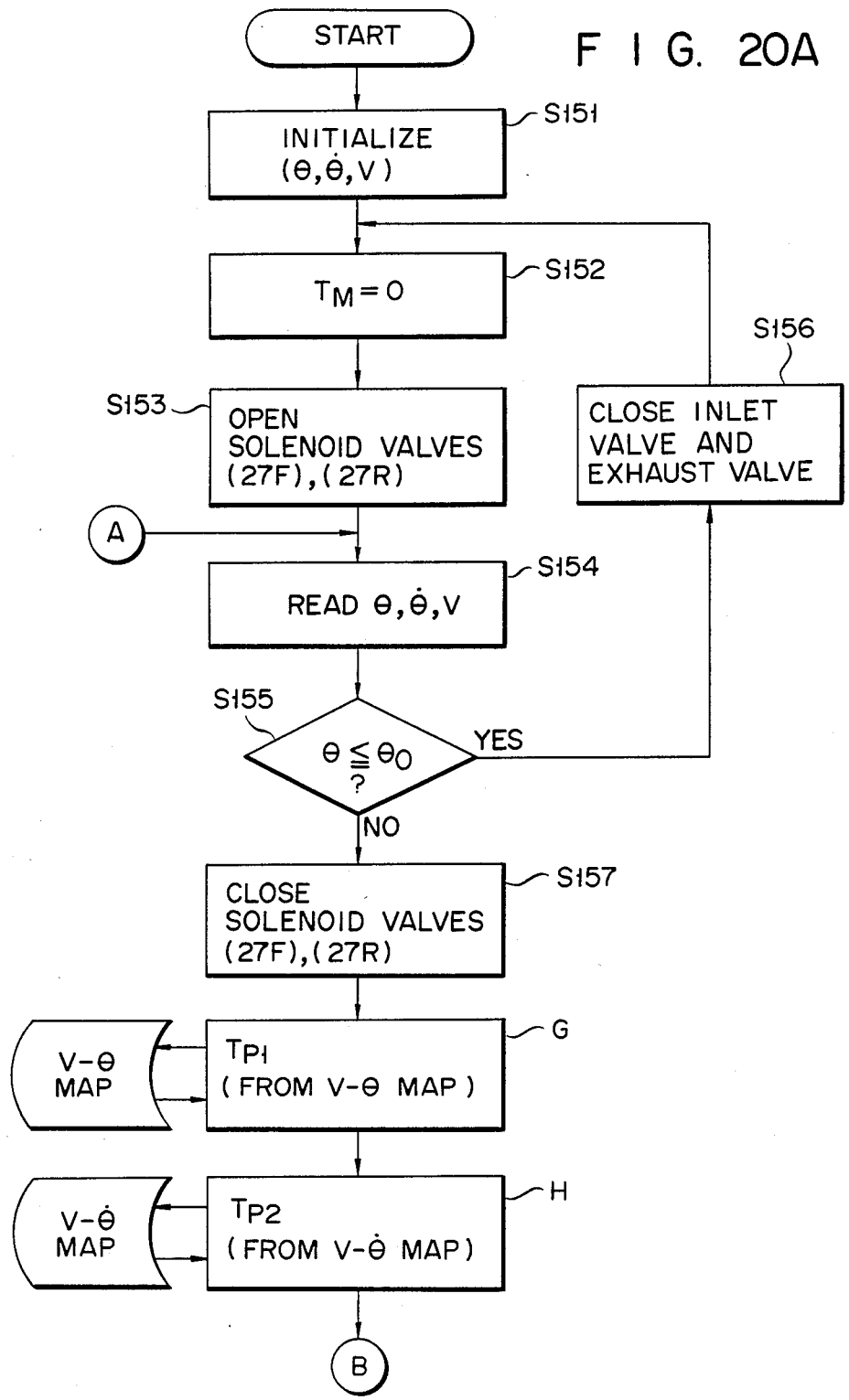

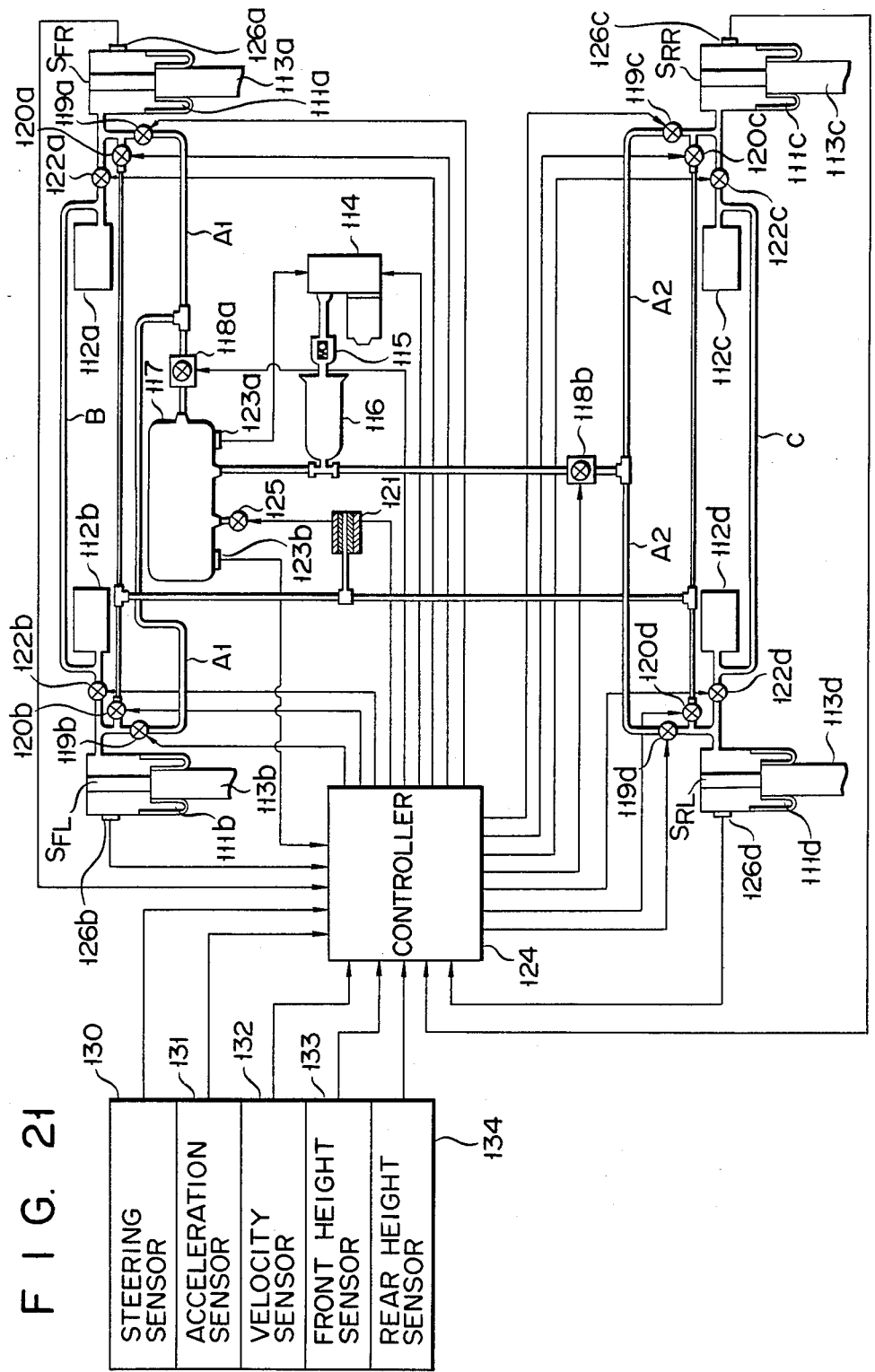
F I G. 21

F I G. 22B
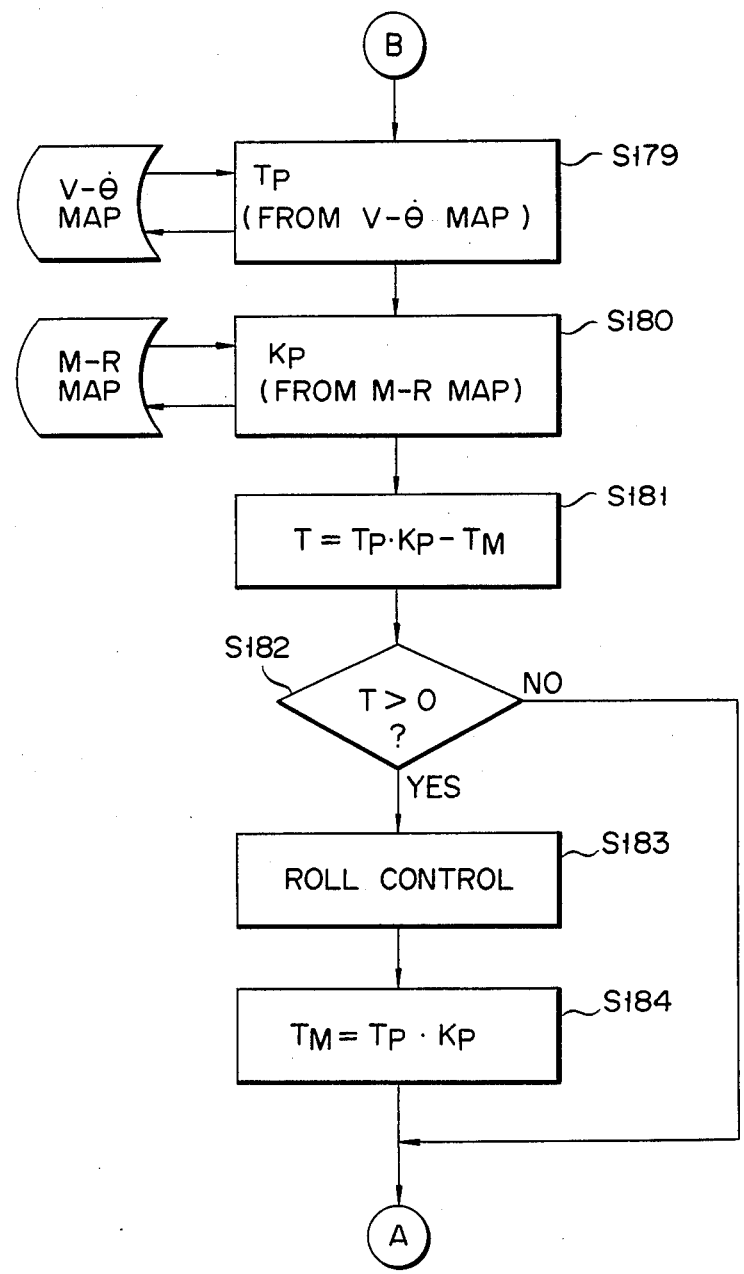

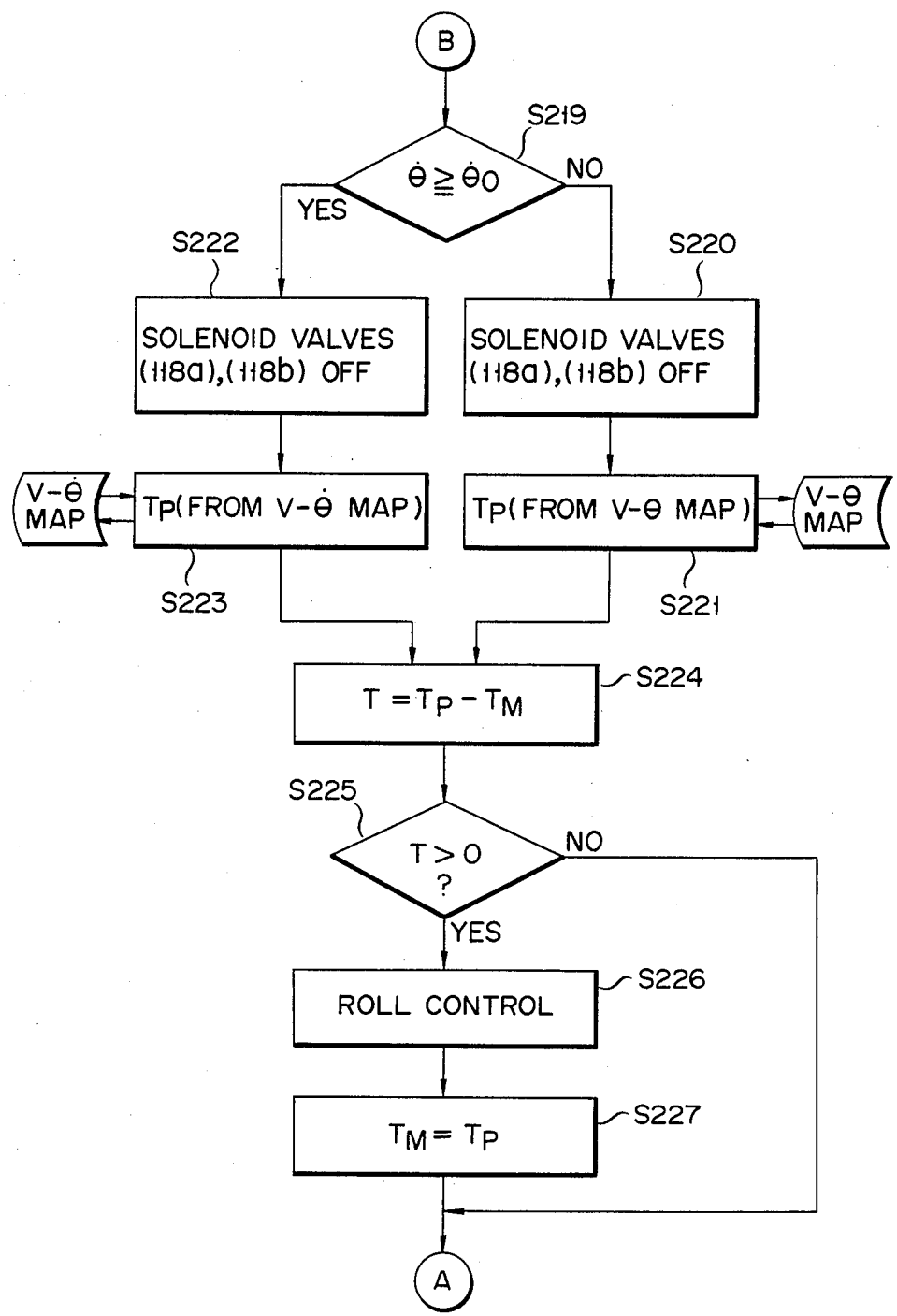

VEHICLE SUSPENSION APPARATUS

BACKGROUND OF THE INVENTION

The present invention relates to a vehicle suspension apparatus for roll controlling of a vehicle when the vehicle turns.

A conventional suspension apparatus is proposed wherein the damping force of a shock absorber mounted in a suspension unit for each wheel and the spring force of an air spring chamber therein are controlled to improve driving comfort and stability. However, demand has arisen to restrict more properly the roll of the vehicle body when the vehicle turns, and to improve driving comfort and stability.

SUMMARY OF THE INVENTION

It is an object of the present invention to provide a vehicle suspension apparatus to control the roll of a vehicle when the vehicle turns.

In order to achieve the above object of the present invention, there is provided a suspension apparatus having: suspension units mounted on respective wheels, each unit having a fluid spring chamber; fluid supply means for supplying a fluid to each fluid spring chamber through a fluid supply valve; and fluid exhaust means for exhausting the fluid from each fluid spring chamber through a fluid exhaust valve, so that the fluid is supplied to the fluid spring chambers of the contracted suspension units with respect to a roll direction and exhausted from the fluid spring chambers of the elongated suspension units when a vehicle changes a position thereof so as to control the change in the position of the vehicle, characterized in that the suspension apparatus comprises:

steering angular velocity detecting means for detecting a steering angular velocity;

velocity detecting means for detecting a vehicle velocity;

control quantity determining means for determining a roll control quantity in accordance with the steering angular velocity detected by the steering angular velocity detecting means and the velocity detected by the velocity detecting means; and roll control means for controlling the roll of a vehicle body by opening/closing the fluid supply valves and the fluid exhaust valves in accordance with the roll control quantity determined by the control quantity determining means.

BRIEF DESCRIPTION OF THE DRAWINGS

FIG. 3 is a graph for explaining the steering angular velocity as a function of the velocity;

FIGS. 16A and 16B are flow charts for explaining the operation of an eighth embodiment of the present invention;

FIGS. 17A and 17B are flow charts for explaining the operation of a ninth embodiment of the present invention;

FIGS. 18A and 18B are flow charts for explaining the operation of a tenth embodiment of the present invention;

FIGS. 20A and 20B are flow charts for explaining the operation of an eleventh embodiment of the present invention;

FIG. 21 is a diagram showing a vehicle suspension apparatus according to a twelfth to a fourteenth embodiments;

FIGS. 22A and 22B are flow charts for explaining the operation of a twelfth embodiment of the present invention;

FIGS. 25A and 25B are flow charts for explaining the operation of a fourteenth embodiment of the present invention;

DETAILED DESCRIPTION OF THE PREFERRED EMBODIMENTS

Figure 1:
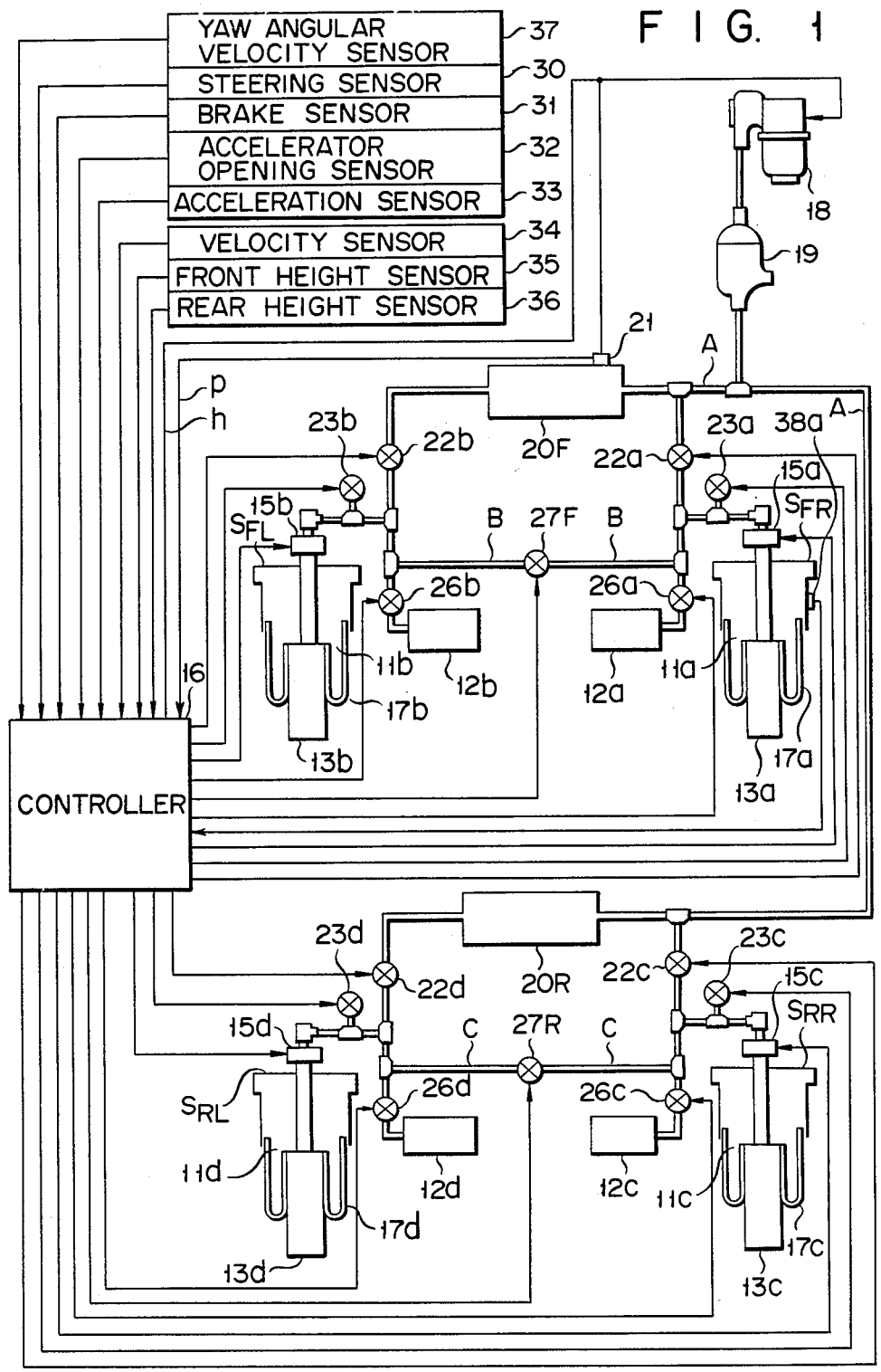
FIG. 1 is a diagram showing the overall construction of a vehicle suspension apparatus according to an embodiment of the present invention.

An electronically controlled suspension apparatus according to the present invention will be described with reference to the accompanying drawings. Referring to FIG. 1, reference symbol $S_{FR}$ denotes a right front wheel suspension unit; $S_{FL}$, a left front wheel suspension unit; $S_{RR}$, a right rear wheel suspension unit; and $S_{RL}$, a left rear wheel suspension unit. The suspension units $S_{FR}$, $S_{FL}$, $S_{RR}$ and $S_{RL}$ respectively comprise main air spring chambers 11a to 11d, sub-air spring chambers 12a to 12d, shock absorbers 13a to 13d, and coil springs (not shown) serving as auxiliary springs. Reference numerals 15a to 15d denote switches for increasing or decreasing the damping forces of the shock absorbers 13a to 13d, respectively. The switches 15a to 15d are controlled by a controller 16. Reference numerals 17a to 17d denote bellows, respectively.

Reference numeral 18 denotes a compressor for compressing atmospheric air supplied from an air cleaner (not shown) and supplying compressed air to a drier 19.

The drier 19 dries compressed air by using silica gel or the like. The dried compressed air from the drier 19 is stored in a front wheel reserve tank 20F and a rear wheel reserve tank 20R through piping A. Reference numeral 21 denotes a pressure sensor arranged in the reserve tank 20F. When an internal pressure in the reserve tank 20F is decreased below a predetermined value, the pressure sensor 21 generates a signal. The compressor 18 is activated in response to this signal. When the internal pressure of the reserve tank 20F exceeds the predetermined value, the compressor 18 is stopped in response to the signal from the pressure sensor 21. An internal pressure signal p from the reserve tank 20F is supplied to the controller 16. The compressor 18 can be controlled in response to a signal h from the controller 16.

The reserve tank 20F is coupled to the main air spring chamber 11a through an inlet solenoid valve 22a. Similarly, the reserve tank 20R is coupled to the main air spring chamber 11b through an inlet solenoid valve 22b. Furthermore, the reserve tank 20R is connected to the main air spring chamber 11c through an inlet solenoid valve 22c. Similarly, the reserve tank 20R is coupled to the main air spring chamber 11d through an inlet solenoid valve 22d. It should be noted that the solenoid valves 22a to 22d comprise normally closed valves.

The compressed air is exhausted to the atmosphere from the main air spring chambers 11a to 11d through corresponding exhaust solenoid valves 23a to 23d and then through an exhaust pipe (not shown). It should be noted that the solenoid valves 23a to 23d comprise normally closed valves.

The main air spring chamber 11a is coupled to the sub-air spring chamber 12a through a spring constant adjusting solenoid valve 26a. Similarly, the main air spring chambers 11b, 11c and 11d are coupled to the sub-air spring chambers 12b, 12c and 12d through spring constant adjusting solenoid valves 26b, 26c and 26d.

The main air spring chambers 11a and 11b are coupled to each other through a communicating pipe B and a communicating solenoid valve 27F. Similarly, the air spring chambers 11c and 11d are coupled to each other through a communicating pipe C and a communicating solenoid valve 27R. It should be noted that the solenoid valves 27F and 27R comprise normally open valves.

The solenoid valves 22a to 22d, 23a to 23d, 26a to 26d, 27F and 27R are controlled in response to control signals from the controller 16.

Reference numeral 30 denotes a steering sensor for detecting a steering wheel angle; 31, a brake sensor for detecting the ON/OFF state of the brake unit; 32, an accelerator opening sensor for detecting a throttle valve opening; 33, an acceleration sensor for detecting acceleration along the horizontal and vertical directions; 34, a velocity sensor for detecting a vehicle velocity; 35, a front height sensor for detecting a height at the front portion (front wheel portion) of the vehicle; 36, a rear height sensor for detecting a height at the rear portion (rear wheel portion) of the vehicle; 37, a yaw angular velocity sensor for detecting the yaw angular velocity of the vehicle; and 38a, an internal pressure sensor for detecting the internal pressure of the main air spring chamber 11a. Steering sensor 30 may be of the digital type or the analog type which is widely used. As the digital type sensor, the steering sensor disclosed in SAE paper 840341 "Toyota Electronic Modulated Suspension (TEMS) System for the 1983 Soarer" (page 7, FIG. 18), or the sensor disclosed in SAE paper 840258 "Chassis Electronic Control System for the Mitsubishi 1984 Galant" (page 4, FIG. 7) may be used. Alternatively, potentiometer 41 disclosed in U.S. Pat. No. 3,608,925 may be used as the analog type steering sensor. Further, the acceleration sensor disclosed in SAE paper 840258 or the like may be employed as the lateral acceleration sensor. Signals from the sensors 30 to 37 and 38a are supplied to the controller 16. Pressure sensors 38b to 38d for detecting an internal pressure of the main air spring chambers 11b to 11d are not shown.

Figure 2A:
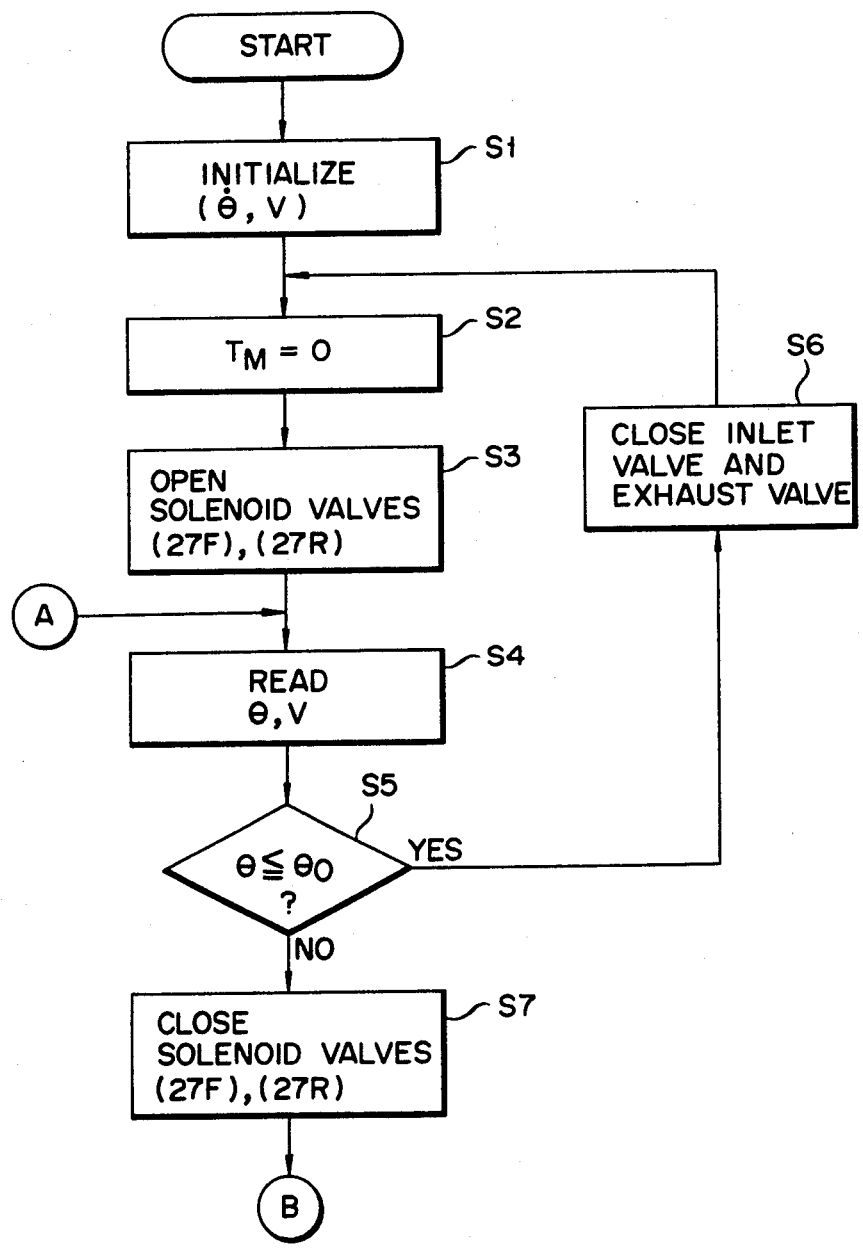
FIGS. 2A and 2B are flow charts for explaining the operation of a first embodiment of the present invention.
Figure 2B:
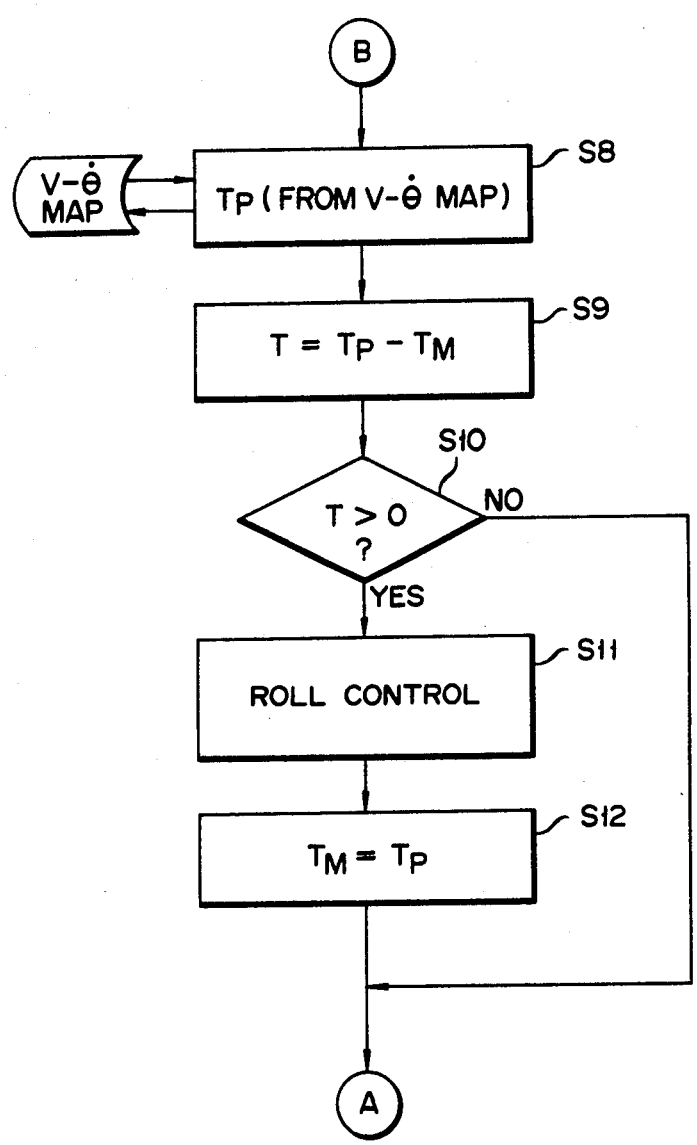

A first embodiment of the present invention will be described with reference to flow charts of FIGS. 2A and 2B. When a driver turns on the ignition, the controller 16 performs the operation started with the flow chart of FIG. 2A. In step S1, a predetermined memory area of the controller 16 which stores a steering angular velocity $\dot{\theta}$ and a velocity V is cleared. In step S2, a map memory $T_M$ is reset ($T_M=0$). In step S3, the controller 16 opens the solenoid valves 27F and 27R. When these solenoid valves 27F and 27R are already opened, the controller 16 checks that the solenoid valves 27F and 27R are open. In step S4, a steering angle $\theta$ detected by the steering sensor 30 and a velocity V detected by the velocity sensor 34 are fetched by the controller 16. The controller 16 calculates the steering angular velocity $\dot{\theta}$, i.e., a change in the detected steering angle $\theta$ as a function of time. The controller 16 checks in step S5 whether or not the steering angle $\theta$ corresponds to a neutral position of the steering wheel, i.e., condition $\theta \leq \theta 0$ is established where $\theta 0$ is a predetermined angle. Here, the neutral position indicates that the steering wheel is not turned clockwise or counterclockwise past the predetermined angle $\theta 0$. If YES in step S5, the flow advances to step S6. In step S6, the inlet solenoid valves 22a to 22d and the exhaust solenoid valves 23a to 23d are closed under the control of the controller 16. If they are already closed, the controller 16 checks that they are closed.

However, if NO in step S5, roll control operation beginning with step S7 is performed. In step S7, the solenoid valves 27F and 27R are closed under the control of the controller 16. In step S8, a control time $T_P$ (i.e., a time for opening the solenoid valve) is calculated in accordance with the graph of FIG. 3 by using the steering angular velocity and the vehicle velocity. This control time $T_P$ is determined in accordance with regions I to VII of the graph of FIG. 3 and is shown in parentheses. When the operation in step S8 is completed, the flow advances to step S9 wherein a control time T ($=T_P-T_M$) is calculated. The controller 16 checks in step S10 whether or not condition $T>0$ is established. If NO in step S10, the flow returns to step S4. In this case, the roll control operation is not performed. However, if YES in step S10, the flow advances to step S11. In step S11, the controller 16 controls the solenoid valves 22a to 22d and 23a to 23d in accordance with the control time T, thereby performing roll control. For example, when the steering wheel is turned clockwise, the left solenoid valves 22b and 22d are opened for the control time T by the controller 16, so that compressed air is supplied to the main air spring chambers 11b and 11d, and the left suspension units $S_{FL}$ and $S_{RL}$ are biased to increase the left vehicle height. At the same time, the right solenoid valves 23a and 23c are opened for the control time T by the controller 16, so that the compressed air is exhausted from the main air spring chambers 11a and 11c, thereby biasing the right suspension units $S_{FR}$ and $S_{RR}$ to decrease the right vehicle height. In other words, when the steering wheel is turned clockwise, a decrease in the left vehicle height and an increase in the right vehicle height are reduced to restrict a roll of the vehicle.

When the operation in step S11 is completed, the flow advances to step S12 wherein the map memory is updated, and thereafter the flow returns to step S4. In other words, let $T_M$ be $T_P$, and the flow returns to step S4 again.

When the control time calculated in step S8 is increased in accordance with an increase in steering angular velocity thereafter, an increment is calculated in step S9. The operation is performed in accordance with the calculated additional control time T in step S9.

In this manner, even after the control operation is started, control quantity can be corrected in accordance with an increase in steering angular velocity $\dot{\theta}$. Therefore, the optimal position control can be performed.

Figure 4:
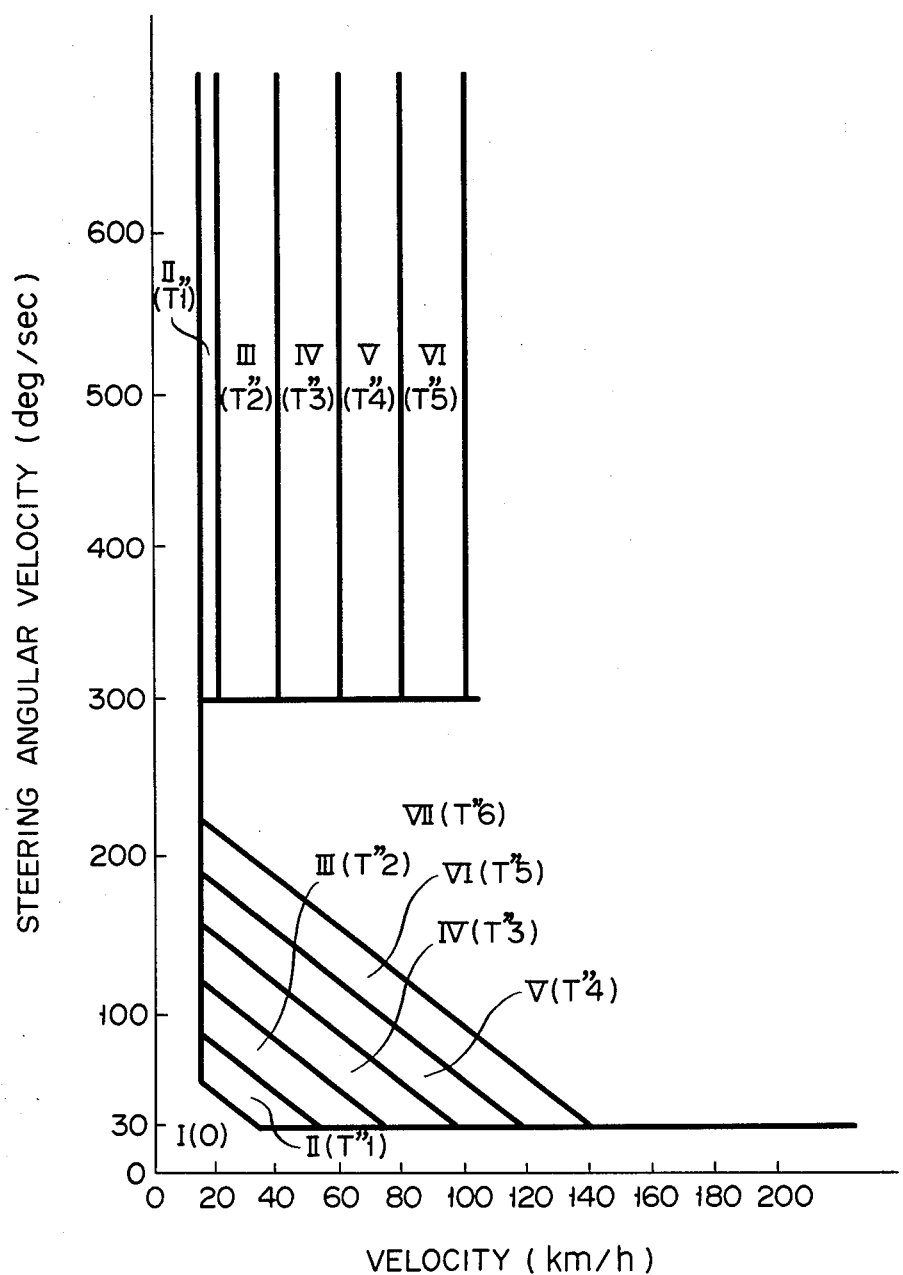
FIG. 4 is another graph for explaining the steering angular velocity as a function of the velocity.

A modification of the $V-\dot{\theta}$ map referred in step S8 is illustrated in FIG. 4. In the $V-\dot{\theta}$ map of FIG. 4, regions II to VI are added when the steering angular velocity is a large value that exceeds, for example, 300 deg/sec.

Figure 5:
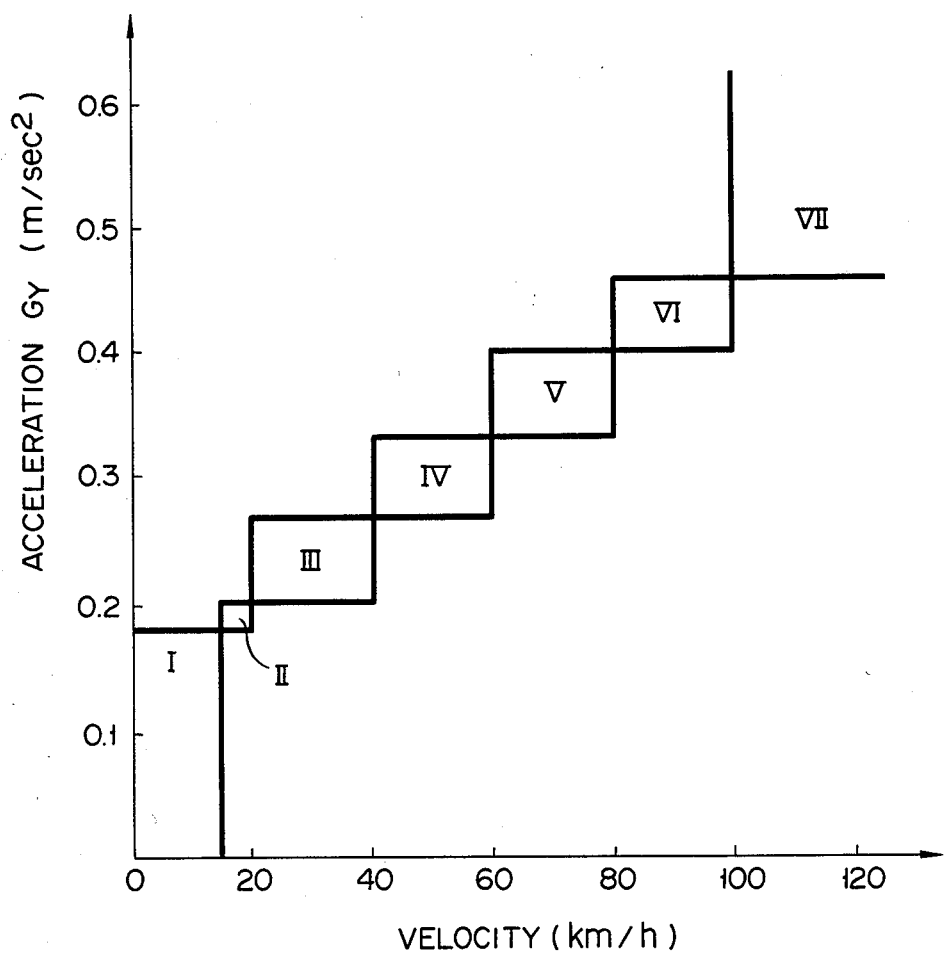
FIG. 5 is another graph for explaining the steering angular velocity as a function of the velocity.

Regions I to VII may be added to a V-lateral G, as shown in FIG. 5, when the steering angular velocity is a large value that exceeds, for example, 300 deg/sec.

In this manner, roll control is performed for the control time T given by the $V-\dot{\theta}$ map. When the vehicle is rapidly turned, i.e., when the steering angular velocity $\dot{\theta}$ is increased, the control time T is increased in accordance with an increase in the steering angular velocity, thereby performing a roll control according to the roll magnitude of the vehicle body.

Figure 6A:
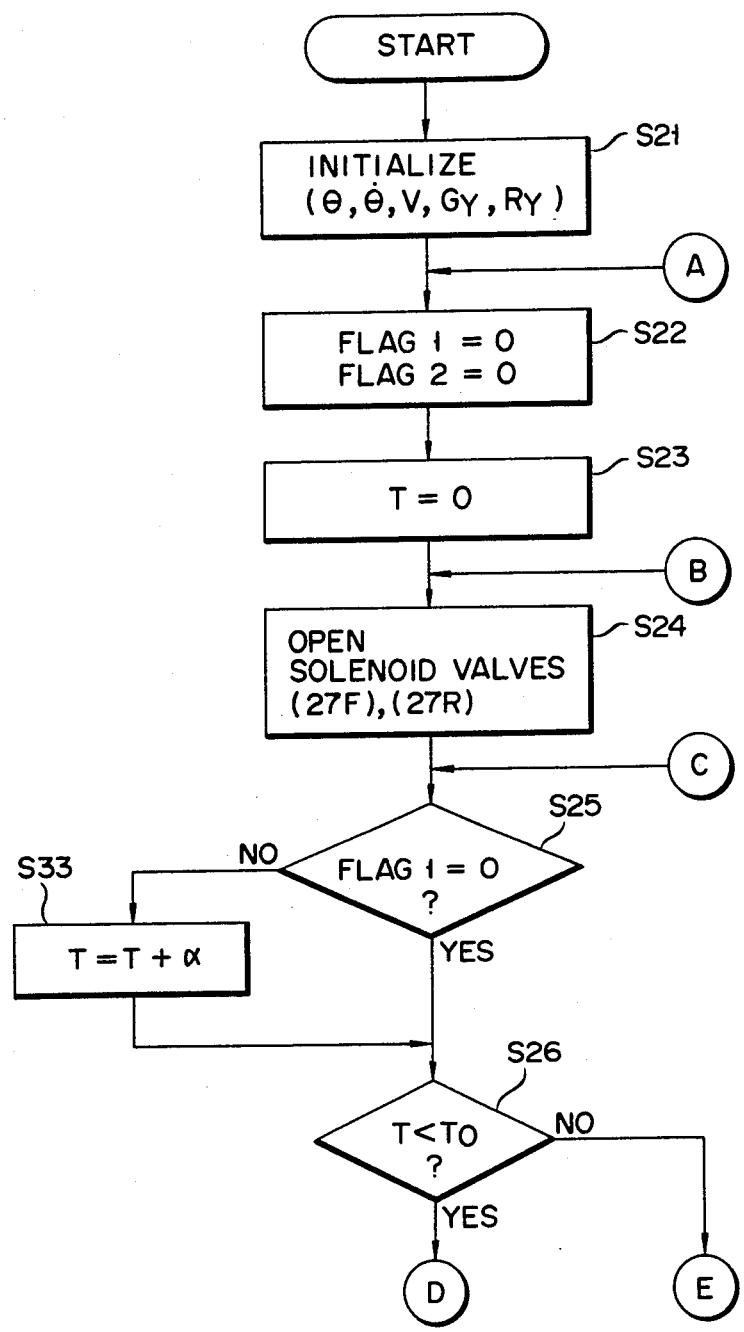
FIGS. 6A to 6C are flow charts for explaining the operation of a second embodiment of the present invention.
Figure 6B:
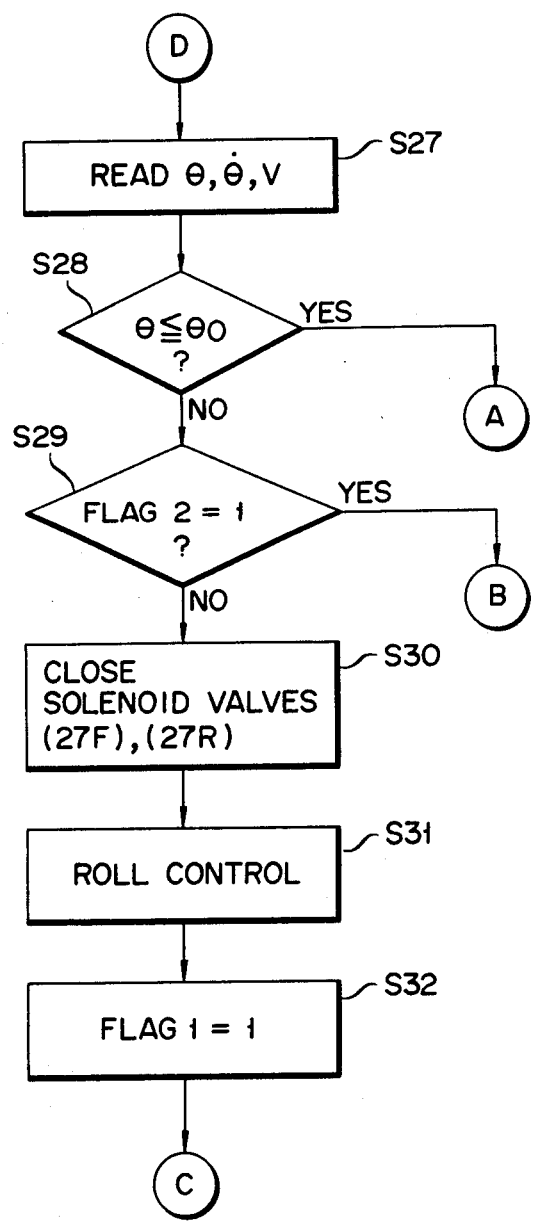
Figure 6C:
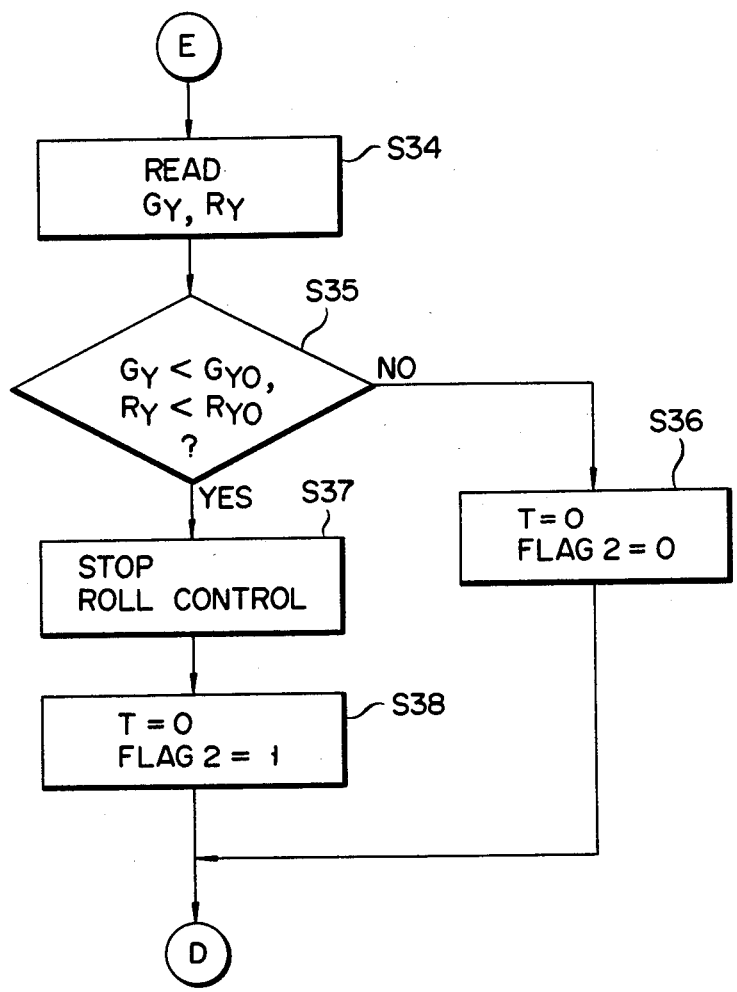

The operation of a second embodiment of the present invention will be described with reference to the flow charts of FIGS. 6A to 6C. When the driver turns on the ignition, the controller 16 performs the operation in accordance with flow charts of FIGS. 6A to 6C. A steering angle $\theta$, a steering angular velocity $\dot{\theta}$, a vehicle velocity V, lateral G (acceleration) and a yaw angular acceleration stored in the controller 16 are cleared (step S21).

Flags 1 and 2 are set at logic "0" (step S22). Flag 1 is set at logic "1" when roll control operation is performed. Flag 2 is set at logic "1" when roll control operation is stopped. A timer T for counting the roll control time is set to zero (step S23). In step S24, the main controller checks if the communicating solenoid valves 27F and 27R are open. If they are closed, the communicating solenoid valves 27F and 27R are opened to cause the main air spring chamber 11a (11c) to communicate with the main air springs chamber 11b (11d). The controller 16 then checks in step S25 whether or not flag 1 is set at logic "0". Since flag 1 is set at logic "0" in step S21, the flow advances to step S26. The controller 16 checks in step S26 whether T is smaller than T0 where T0 is a period of time required to generate a predetermined lateral G and the yaw angular acceleration. Since the timer T is set at zero in step S23, condition T<T0 is a is established, and the flow advances to step S27. In step S27, the controller 16 fetches data of the steering angle $\theta$, the steering angular velocity $\dot{\theta}$, and the velocity V in accordance with signals from the steering sensor 30 and the velocity sensor 34. The controller 16 checks in step S28 whether the steering wheel is positioned in the neutral position in accordance with the steering angle $\theta$. If YES in step S28, the flow returns to step S22. However, if NO in step S28, the flow advances to step S29 so as to check whether or not flag 2 is set. Since flag 2 is set at logic "0" in step S22, the flow advances to step S30. It should be noted that the flow returns to step S24 when flag 2 is determined to be set at logic "1". In step S30, the controller 16 checks if the solenoid valves 27F and 27R are closed, and if not, closes them. In other words, the main air spring chambers 11a and 11b are disconnected from each other, and the main air spring chambers 11c and 11d are disconnected from each other. The flow advances to step S31 wherein roll control is performed by the controller 16. The content of the roll control is given as follows. For example, assume that the steering wheel is turned clockwise. In this case, the left vehicle height is decreased and the right vehicle height is increased. In order to reduce this effect, the inlet solenoid valves 22b and 22d and the exhaust solenoid valves 23a and 23c are respectively opened for a predetermined period of time T to bias the left suspension units $S_{FL}$ and $S_{RL}$ to increase the left vehicle height and to bias the right suspension units $S_{FR}$ and $S_{RR}$ to decrease the right vehicle height. Time T is calculated in the same way as the first embodiment in accordance with the $V-\dot{\theta}$ map of FIG. 3 by using the steering angular velocity and the vehicle velocity. Thus, even if the steering wheel is turned clockwise, the left vehicle height is prevented from decreasing and the right vehicle height is restricted. However, when the steering wheel is turned counterclockwise, the right vehicle height is decreased, and the left vehicle height is increased. In order to reduce this effect, the inlet solenoid valves 22a and 22c and the exhaust solenoid valves 23b and 23d are respectively also opened for a predetermined period of time T, thereby biasing the right suspension units $S_{FR}$ and $S_{RR}$ to increase the right vehicle height and biasing the left suspension units $S_{FL}$ and $S_{RL}$ to decrease the left vehicle height. Thus, even if the steering wheel is turned counterclockwise, the right vehicle height will not be decreased nor the left vehicle height increased, and the vehicle is kept horizontal.

When the roll control operation is performed by the controller 16 in step S31, flag 1 is set at logic "1" in step S32, and the flow returns to step S25. The controller 16 checks in step S25 whether or not flag 1 is set at logic "1". In this case, since flag 1 is set at logic "1" in step S32, the flow advances to step S33 wherein the timer T is incremented by $+\alpha$ where $\alpha$ is a period of time required for performing the operation in steps S25 to S32. The controller 16 then checks in step S26 whether or not condition T<T0 is established. If YES in step S26, the operation in steps S27 to S32 is repeated again. In step S33, the timer T is incremented by $+\alpha$. In this manner, as long as condition T<T0 is established, the operation in steps S27 to S32 is repeated. However, if NO in step S26, the flow advances to step S34. Data $G_Y$ representing the lateral G from the acceleration sensor 33 and data $R_Y$ representing the yaw angular acceleration are fetched by the controller 16 in step S34. The lateral G ($G_Y$) is compared with a reference lateral G ($G_{Y0}$), and the yaw angular acceleration data $R_Y$ is compared with data of a reference yaw angular acceleration $R_{Y0}$, in step S35. In step S35, if conditions $G_Y \geq G_{Y0}$ or $R_Y \geq R_{Y0}$ are established, the flow advances to step S36. In step S36, the timer T is set to zero, and flag 2 is set at logic "0". Thereafter, the flow returns to step S27. In step S35, if conditions $G_Y < G_{Y0}$ and $R_Y < R_{Y0}$ are established, the flow advances to step S37, and roll control operation performed in step S31 is stopped. Thereafter, the flow advances to step S38. In step S38, the timer T is cleared and flag 2 is set at logic "1". The flow then returns to step S27.

Roll control is stopped if the predetermined yaw angular acceleration or lateral acceleration is not generated (i.e., while the vehicle is sliding) when a predetermined period of time T0 has elapsed after roll control for preventing a roll of the vehicle body is started. When the vehicle slides on a road having a low surface resistance (e.g., on a snow-covered road), without turning, even if the steering wheel is turned, roll control is stopped. Therefore, changes of the vehicle position due to an unnecessary roll control can be prevented.

Figure 7A:
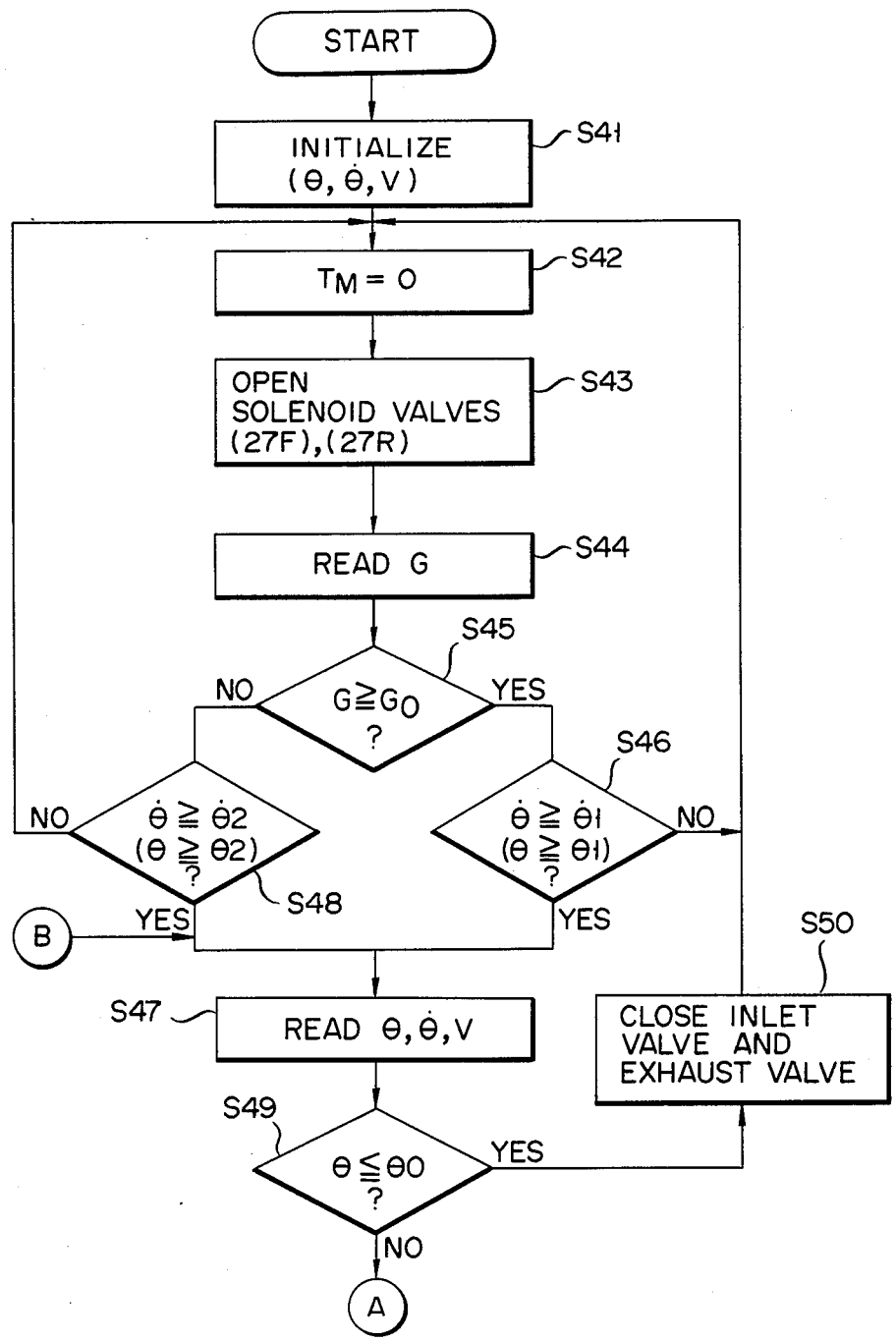
FIGS. 7A and 7B are flow charts for explaining the operation of a third embodiment of the present invention.
Figure 7B:
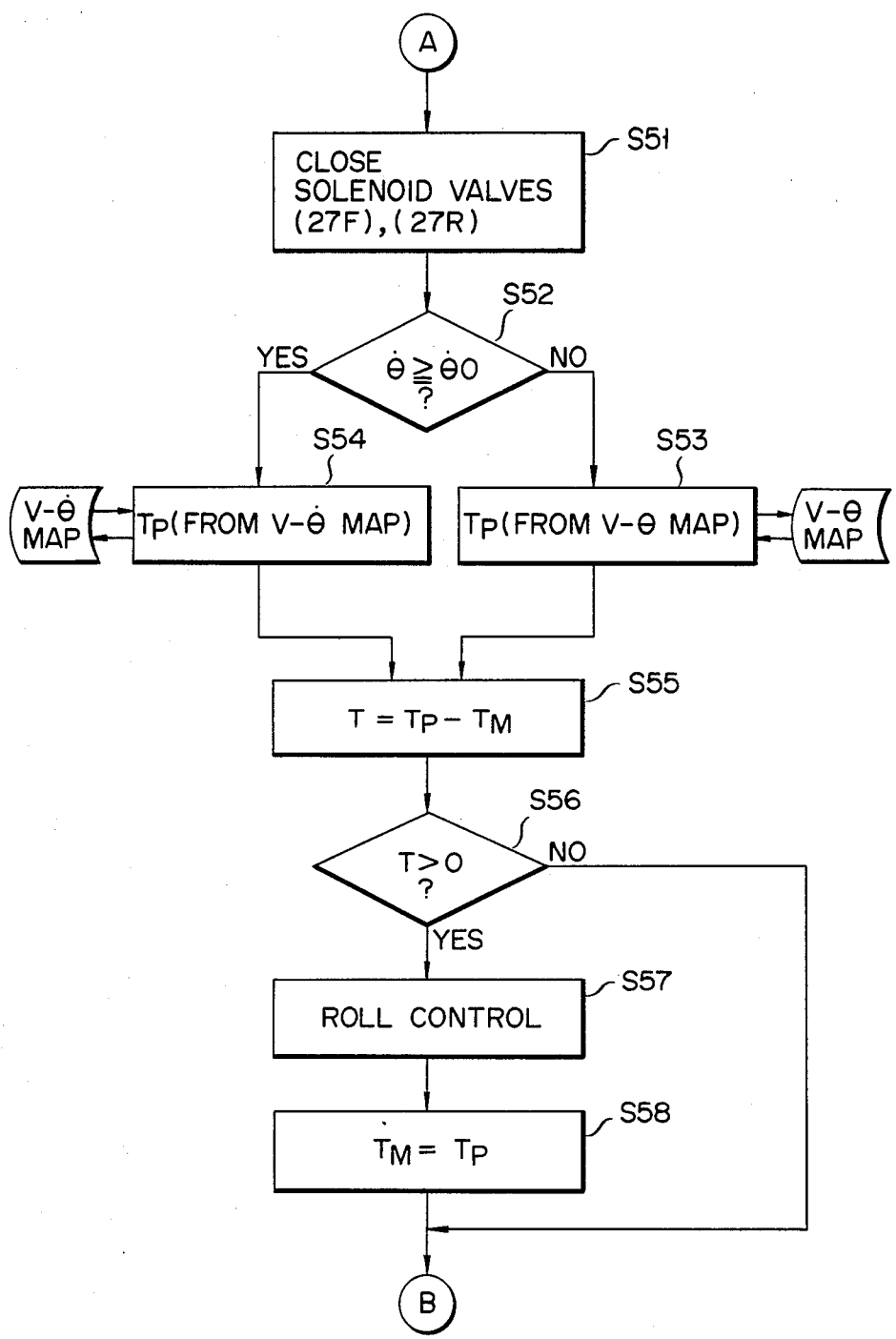

The operation of a third embodiment of the present invention will be described with reference to flow charts of FIGS. 7A and 7B. When the driver turns on the ignition, the controller 16 performs the operation in accordance with the flow charts of FIGS. 7A and 7B. In step S41, a predetermined memory area of the controller 16 which stores the steering angle $\theta$, the steering angular velocity $\dot{\theta}$ and the velocity V is cleared. In step S42, the map memory $T_M$ is reset ($T_M = 0$). In step S43, the solenoid valves 27F and 27R are opened. However, when the solenoid valves 27F and 27R are already open, the controller 16 checks that they are open.

In step S44, a vertical acceleration G detected by the acceleration sensor 33 is supplied to the controller 16. The controller 16 checks in step S45 whether or not the detected acceleration G is equal to or larger than a reference acceleration G0. If YES in step S45, the flow advances to step S46. The controller 16 then checks in step S46 whether or not the detected steering angular velocity $\dot{\theta}$ (or the detected steering angle $\theta$) is equal to or larger than a reference angular velocity $\dot{\theta}1$ (or a reference angle $\theta1$). If NO in step S46, the flow returns to step S42. In this case, roll control is not performed. However, if YES in step S46, the flow advances to step S47. It should be noted that if NO in step S45, the flow advances to step S48 to cause the controller 16 to determine whether or not the detected angular velocity $\dot{\theta}$ (or the detected steering angle $\theta$) is equal to or larger than a reference angular velocity $\dot{\theta}2$ (or a reference angle $\theta2$), and that condition $\dot{\theta}1 > \dot{\theta}2$ ($\theta1 > \theta2$) is established. If NO in step S48, the flow returns to step S42. However, if YES in step S48, the flow advances to step S47. In step S47, a steering angle $\theta$ detected by the steering sensor 30 is supplied to the controller 16. The controller 16 calculates a steering angular velocity $\dot{\theta}$, i.e., a change a steering angle $\theta$ as a function of time, in accordance with the input steering angle $\theta$. The velocity V detected by the velocity sensor 34 is also supplied to the controller 16. The controller 16 checks in step S49 whether or not the steering angle $\theta$ corresponds to the neutral position, i.e., condition $\theta \leq \theta0$ is established. The neutral position indicates that the steering wheel is not turned clockwise or counterclockwise over the reference angle $\theta$. If YES in step S49, the flow advances to step S50. In step S50, the inlet solenoid valves 22a to 22d and the exhaust solenoid valves 23a to 23d are closed under the control of the controller 16. However, when these solenoid valves are already closed, the controller 16 checks that they are closed.

Figure 8:
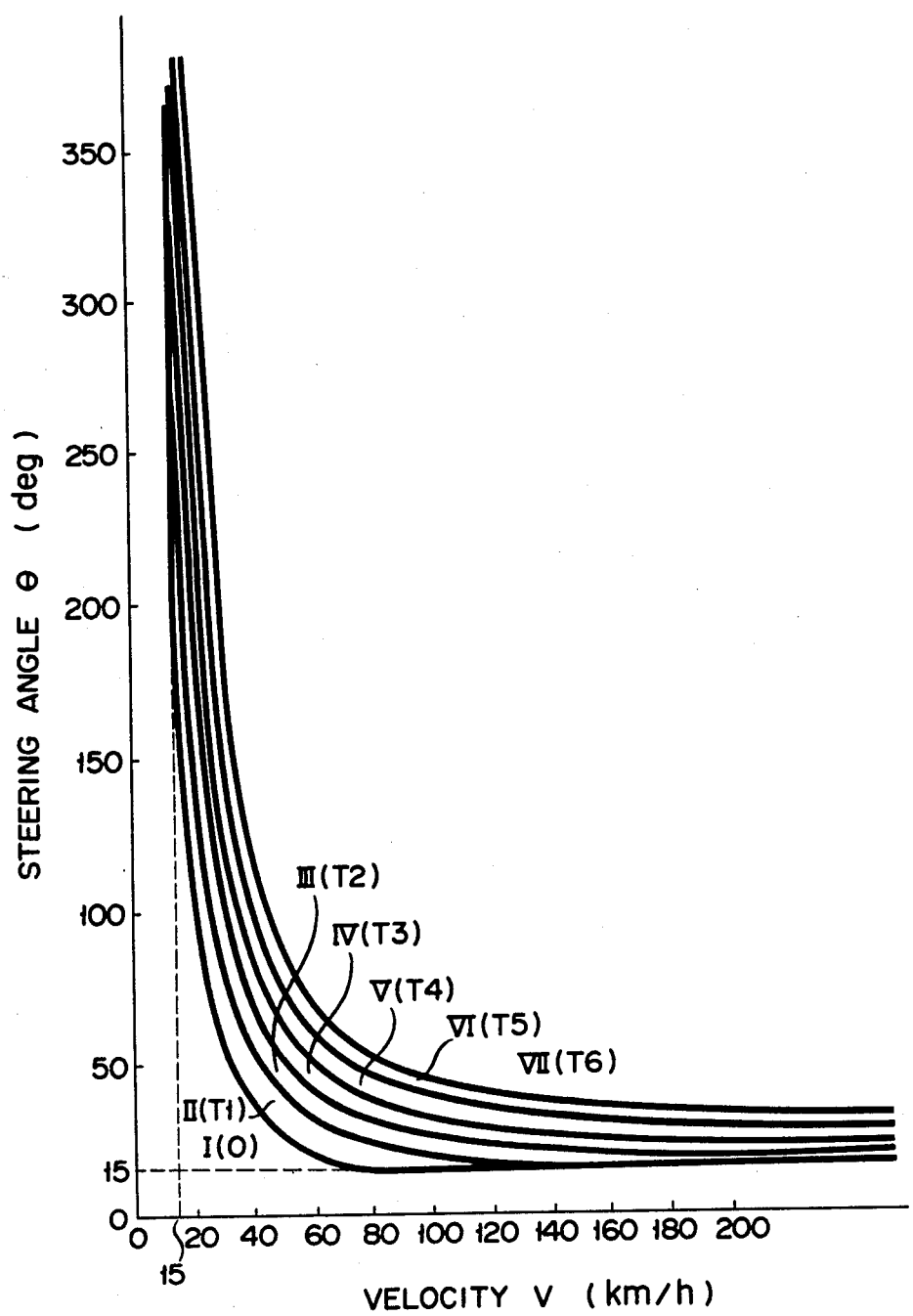
FIG. 8 is a graph for explaining the steering angle as a function of the velocity.

However, if NO in step S49, roll control is performed after step S51. In step S51, the communicating solenoid valves 27F and 27R are closed under the control of the controller 16. The controller 16 then checks in step S52 whether or not the steering angular velocity $\dot{\theta}$ is equal to or larger than the reference angular velocity $\dot{\theta}0$. If NO in step S52, the flow advances to step S53. The controller 16 calculates a control time $T_P$ (i.e., a time for opening the solenoid valves) in accordance with $V - \theta$ (FIG. 8) by using the steering angle $\theta$ and the velocity V. The control time $T_P$ is derived from the regions I to VII of FIG. 8 and is represented in parentheses.

However, if YES in step S52, the flow advances to step S54. In step S54, the controller 16 calculates a control time $T_P$ (i.e., a time for opening the solenoid valves) in accordance with $V - \dot{\theta}$ map by using the steering angular velocity $\dot{\theta}$ and the velocity V. This control time $T_P$ is derived from the regions I to VII of FIG. 3 and is represented by parentheses. When step S53 or S54 is completed, the flow advances to step S55 wherein a control time $T$ ($= T_P - T_M$) is calculated. The flow advances to step S56, and the controller 16 checks whether or not $T > 0$ is established. If NO in step S56, the flow returns to step S47. In this case, roll control is not performed. However, if YES in step S56, the flow advances to step S57. In step S57, the inlet solenoid valves 22a to 22d and the exhaust solenoid valves 23a to 23d are controlled to perform vehicle position control. For example, when the steering wheel is turned clockwise, the left wheel inlet solenoid valves 22b and 22d are opened for the control time T to supply the compressed air to the main air spring chambers 11b and 11d under the control of the controller 16. The left suspension units $S_{FL}$ and $S_{RL}$ are biased to increase the left height. At the same time, the right wheel exhaust solenoid valves 23a and 23c are opened for the control time T to exhaust the compressed air from the main air spring chambers 11a and 11c under the control of the controller 16, thereby biasing the right suspension units $S_{FR}$ and $S_{RR}$ to decrease the right height. Therefore, when the steering wheel is turned clockwise, the left vehicle height is prevented from decreasing, and the right vehicle height is restricted, so that the vehicle body is maintained horizontally.

When the operation in step S57 is completed, the flow advances to step S58. In this step, the map memory is updated, i.e., let $T_M$ be $T_P$. And the flow returns to step S47.

When the vertical acceleration acting on the vehicle body is increased (e.g., when the vehicle travels along a rough road), a roll control threshold value for starting roll control is increased. Therefore, an unnecessary operation for starting roll control upon an increase of the steering angular velocity by repeating a small rapid steering is prevented even if the vehicle travels along a rough road.

The operation of a fourth embodiment of the present invention will be described with reference to flow charts of FIGS. 9A and 9B and FIGS. 10 to 12. In step S61 in FIG. 9A, a velocity V detected by the velocity sensor 34 is fetched by the controller 16. In step S62, a steering angle $\theta$ detected by the steering sensor 30 is fetched by the controller 16. The controller 16 calculates a change in steering angle $\theta$ as a function of time, i.e., a steering angular velocity $\dot{\theta}$. In step S63, the controller checks whether a current $V - \dot{\theta}$ belongs to a control area (a region subject to roll control) or a non-control area (a region not subject to roll control) with reference to the map for determining a time for opening the valves in response to the $V - \dot{\theta}$ (FIG. 3) stored in the controller 16, by using the velocity V and the steering angular velocity $\dot{\theta}$. When the current $V - \dot{\theta}$ is determined to belong to the control area in step S63, the flow advances to step S64. In step S64, a steering direction is detected in response to the signal from the steering sensor 30. In step S65, the steering direction is determined. For example, when the steering wheel is turned clockwise, the flow advances to step S66 to close the communicating solenoid valves 27F and 27R in response to the control signal from the controller 16. The left wheel inlet solenoid valves 22b and 22d are opened for a predetermined period of time determined by the regions I to VII of FIG. 3, so that compressed air is supplied to the air spring chambers 11b and 11d, thereby biasing the left suspension units $S_{FL}$ and $S_{RL}$ to increase the left vehicle height. At the same time, the right wheel exhaust solenoid valves 23a and 23c are also opened for a predetermined period of time determined by the regions I to VII of FIG. 3. The compressed air is exhausted from the main air spring chambers 11a and 11c, so that the right suspension units $S_{FR}$ and $S_{RR}$ are biased to decrease the right vehicle height. Therefore, when the steering wheel is turned clockwise, the left vehicle height will not be decreased and the right vehicle height will not be increased, thus performing the optimal roll control operation.

However, when the steering wheel is turned counterclockwise, the flow advances to step S67, and the solenoid valves 27F and 27R are closed.

The left wheel exhaust solenoid valves 23b and 23d are opened for a predetermined period of time determined by the regions I to VII of FIG. 3 to exhaust the compressed air from the main spring chambers 11b and 11d. At the same time, the right wheel inlet solenoid valves 22a and 22c are also opened for a predetermined period of time determined by the regions I to VII of FIG. 3, so that compressed air is supplied to the main air spring chambers 11a and 11c. In this manner, when the steering wheel is turned counterclockwise, the right vehicle height will not be decreased and the left vehicle height will not be increased, thereby maintaining the vehicle body horizontally.

The flow advances to step S68 after the above-mentioned roll control is completed. In step S68, a steering angle $\theta$ is detected in accordance with a signal from the steering sensor 30. The controller 16 checks in step S69 whether or not the steering angle $\theta$ is larger than the predetermined angle $\theta 0$ (e.g., $\pm 15$ degrees). If NO in step S69, the flow advances to step S70. In step S70, the communicating solenoid valves 27F and 27R are opened, and the flow returns to step S61. Roll control is thus cancelled.

However, if YES in step S69, the flow advances to step S71, and a velocity V detected by the velocity sensor 34 is fetched by the controller 16. In step S72, the velocity is compared with the reference velocity V0 (e.g., 20 km/h), i.e., the controller checks whether or not condition $V \leq V0$ is established. If YES in step S72, the flow advances to step S73 to open the communicating solenoid valves 27F and 27R to cause the front main air spring chambers 11a and 11b to communicate with each other and cause the rear main air spring chambers 11c and 11d to communicate with each other, so that roll control is cancelled. However, if NO in step S72, the flow returns to step S61. In other words, roll control performed in steps S66 and S67 is cancelled when the steering angle $\theta$ is smaller than the predetermined angle $\theta 0$ or when the velocity V is lower than the predetermined velocity V0.

As above mentioned, when the velocity becomes lower than the reference velocity, roll control is immediately cancelled. The communicating solenoid valves are opened even if the vehicle stops with the steering angle exceeding the reference angle $\theta 0$, thus restoring the position of the vehicle body.

Figure 9A:
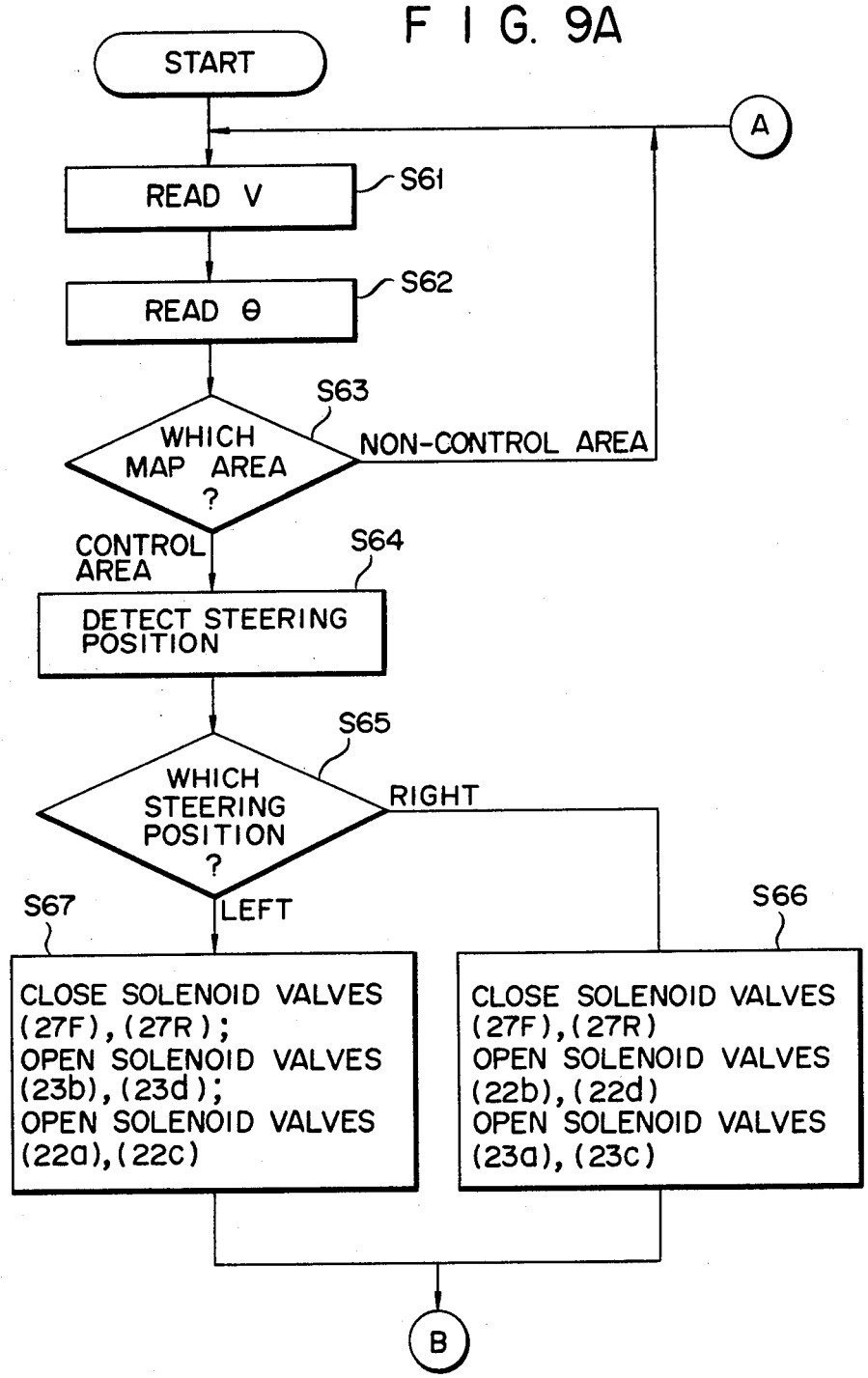
FIGS. 9A and 9B and FIGS. 10 to 12 are flow charts for explaining the operation of a fourth embodiment of the present invention.
Figure 9B:
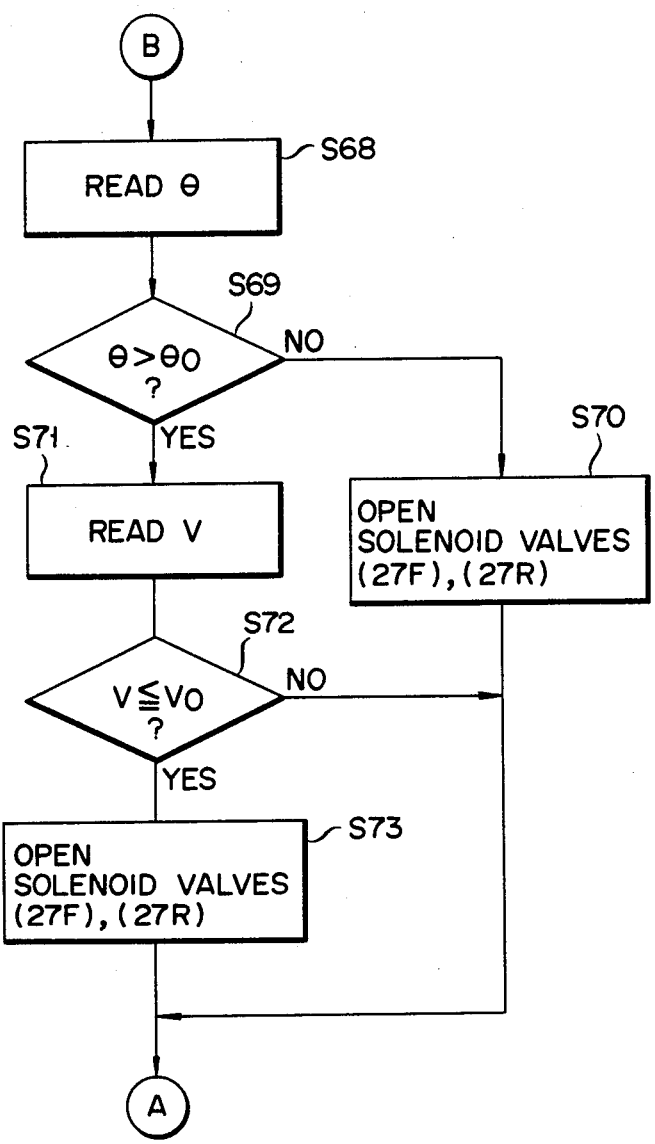
Figure 10:
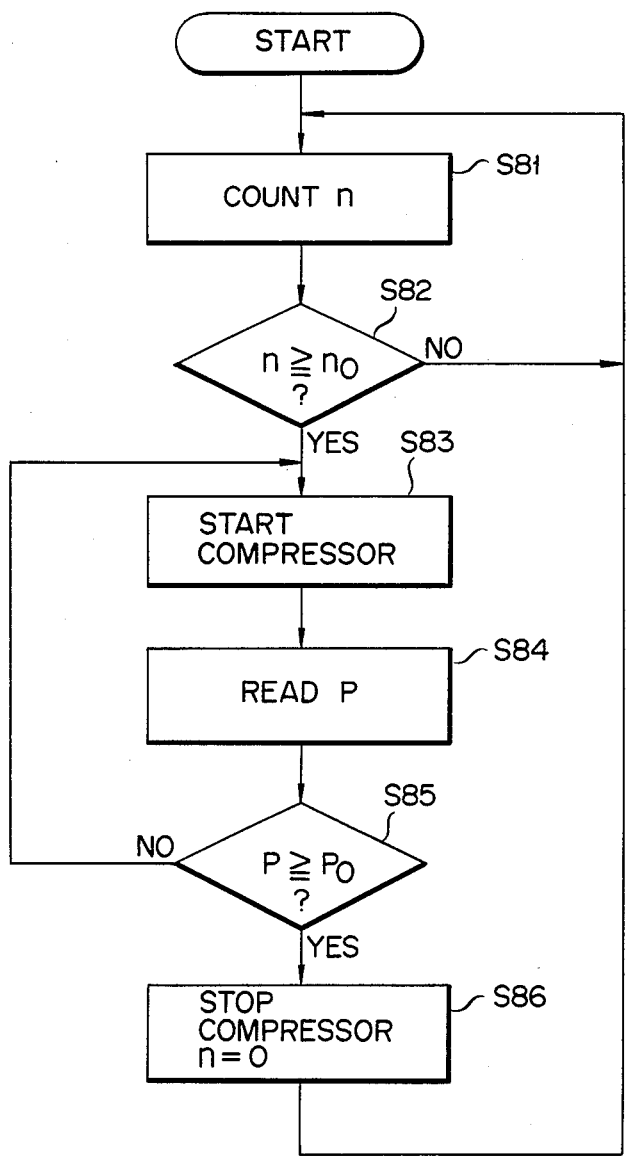
Figure 11:
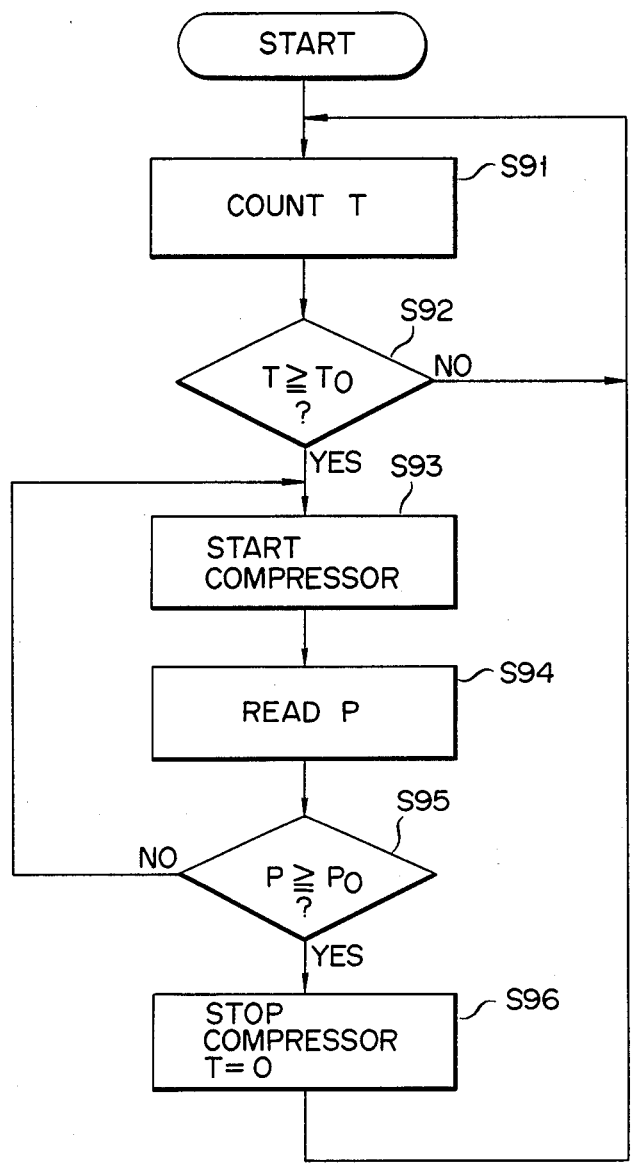
Figure 12:
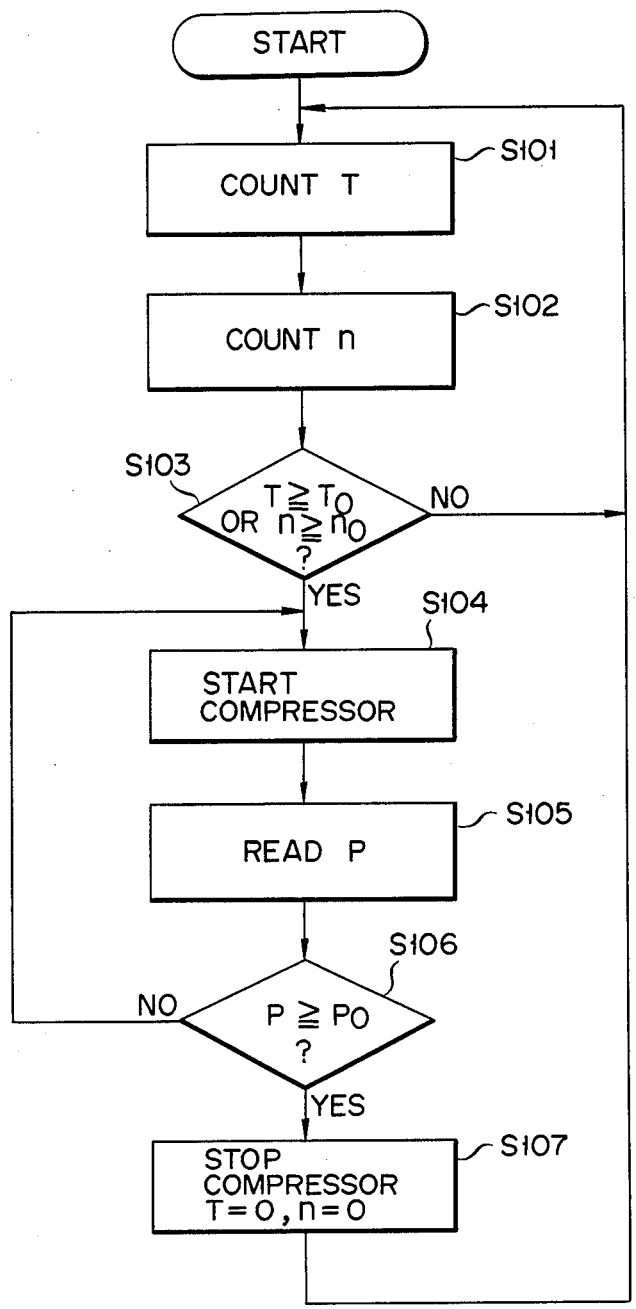

Any one of the operations in FIGS. 10 to 12 is performed while roll control operation in FIGS. 9A and 9B is performed. When roll control is performed, the compressed air is supplied from the reserve tanks 20F and 20R to the main air spring chambers 11a to 11d through inlet solenoid valves 22a to 22d. When such roll control is frequently performed, the internal pressures of the reserve tanks 20F and 20R are decreased, and the supply capacities of the reserve tanks 20F and 20R are lowered. Since roll control could not then be efficiently performed, the foregoing operations (FIGS. 10 to 12) take place to activate the compressor 18 according to decreases in internal pressures of the reserve tanks 20F and 20R.

The operation in FIG. 10 will be described. In step S81, a number n times of ON operations of the inlet solenoid valves 22a to 22d is counted by the controller 16. The controller 16 checks in step S82 whether or not the counted number n is equal to or larger than a reference number n0 (e.g., optimally 3). If YES in step S82, the flow advances to step S83. In this step, the controller 16 supplies a signal h to the compressor 18 which is then driven. In step S84, the pressure signal p from the reserve tank 20F (20R) is supplied to the controller 16. The controller 16 then checks in step S85 whether or not the detected pressure P is equal to or higher than a reference pressure P0 (preferably, 0.5 kg/cm$^2$). If YES in step S85, the flow advances to step S86, and the compressor 18 is stopped under the control of the controller 16, and the count number n is reset to "0" to count a number n next. Thereafter, the flow returns to step S81.

Another operation in FIG. 11 will be described. In step S91, an accumulated ON time T of the inlet solenoid valves 22a to 22d is counted. The controller 16 then checks in step S92 whether or not the accumulated time T is equal to or longer than a reference time T0 (preferably, 500 msec). If YES in step S92, the flow advances to step S93 wherein the compressor 18 is driven. In step S94, the pressure signal from the reserve tank 20F (20R) is supplied to the controller 16. The controller 16 then checks in step S95 whether or not the detected pressure P is equal to or higher than the reference pressure P0. If YES in step S95, the compressor 18 is stopped in step S96, T is then reset to "0" to count a time T. Therefore, the flow returns to step S91.

Still another operation in FIG. 12 will be described hereinafter. In step S101, an accumulated ON time T of the inlet solenoid valves 22a to 22d is calculated. In step S102, a number n times of ON operations of the inlet solenoid valves 22a to 22d is calculated. The controller 16 then checks in step S103 whether or not condition $T \geq T0$ or $n \geq n0$ is established. If YES in step S103, the flow advances to step S104 wherein the compressor 18 is driven. In step S105, the pressure signal p from the reserve tank 20F (20R) is supplied to the controller 16. The controller 16 checks in step S106 whether or not condition $P \geq P0$ is established. If YES in step S106, the flow advances to step S107. In this step, the compressor 18 is stopped, and n and T are respectively reset to "0" to count a number n and a time T. Thereafter, the flow returns to step S101.

The operations in FIGS. 10 to 12 are selectively performed in accordance with the operations of the inlet solenoid valves 22a to 22d. However, these operations may be selectively performed in accordance with the operations of the exhaust solenoid valves 23a to 23d.

In this manner, when the accumulated ON time of the inlet or exhaust solenoid valves exceeds a reference time, the compressor is quickly operated to supply the compressed air to the reserve tanks, thereby increasing the air pressures of the reserve tanks and enabling rapid roll control.

Figure 13A:
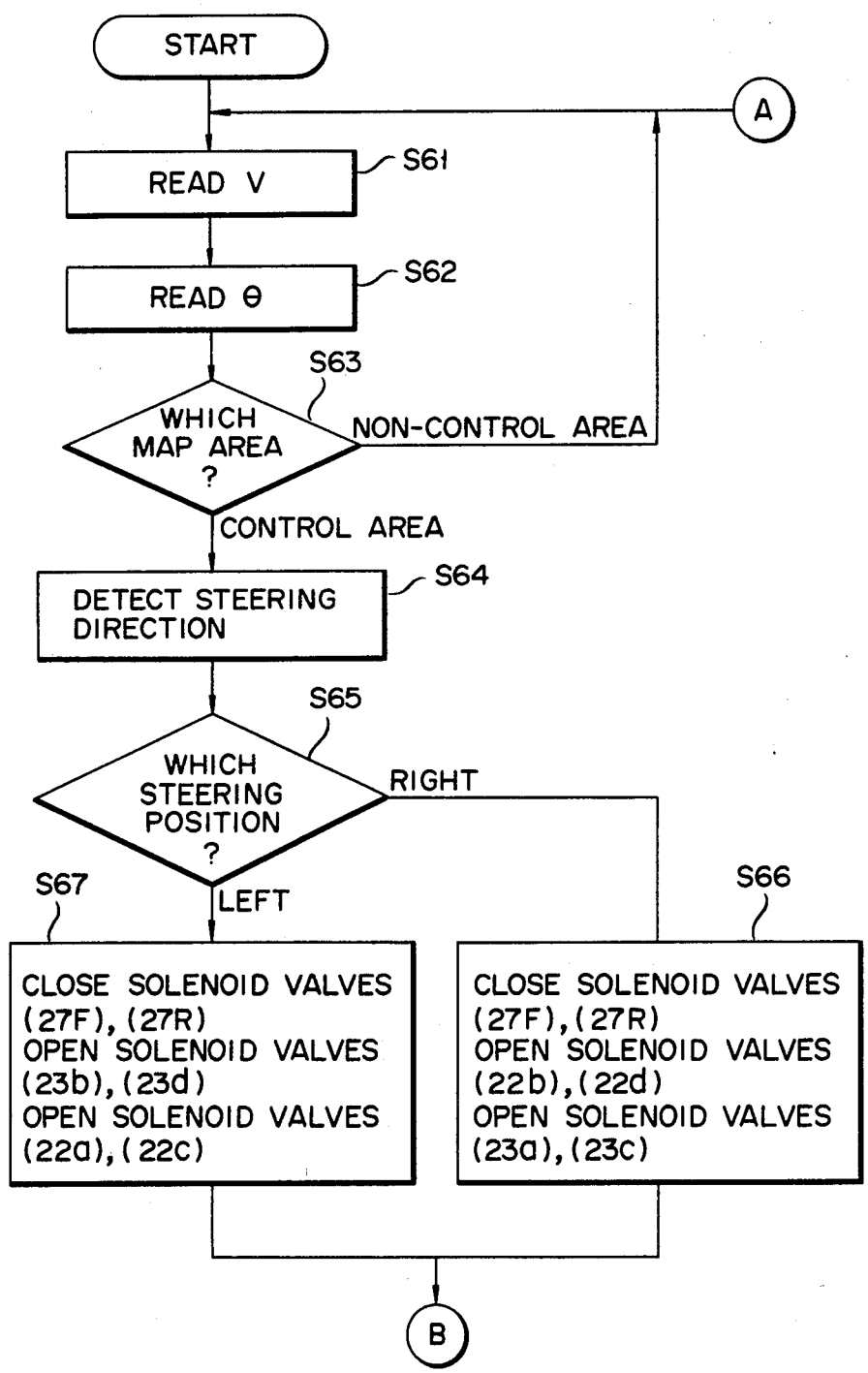
FIGS. 13A and 13B are flow charts for explaining the operation of a fifth embodiment of the present invention.
Figure 13B:
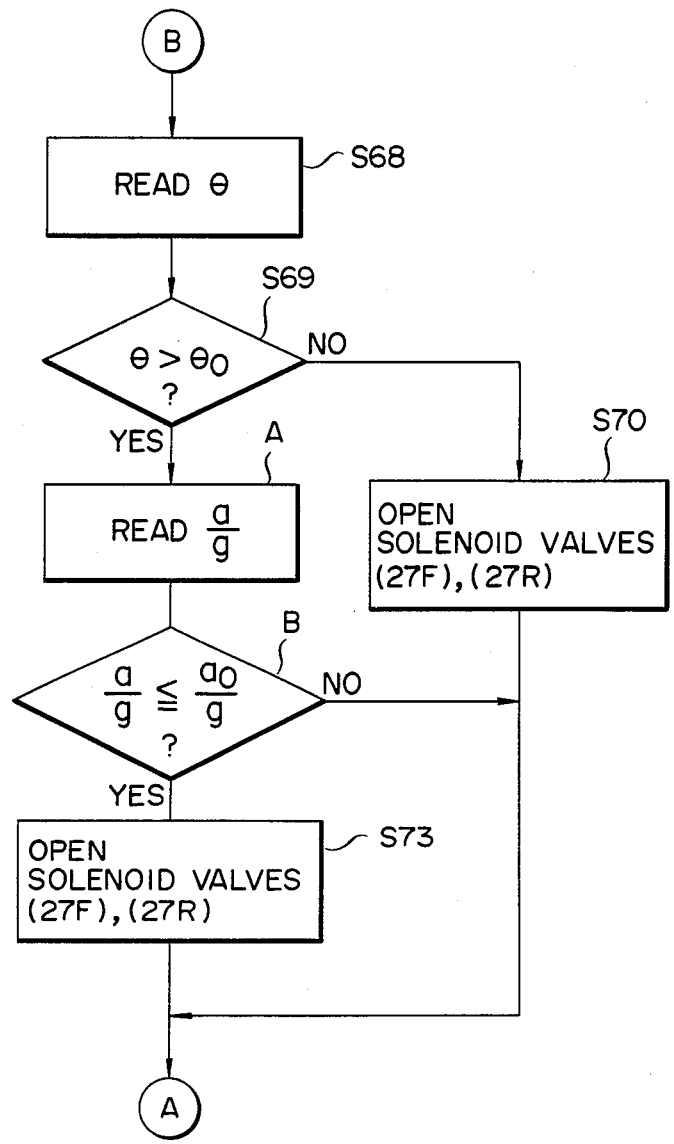

The operation of a fifth embodiment of the present invention will be described with reference to flow charts of FIGS. 13A and 13B. In the fifth embodiment, instead of performing steps S71 and S72 of FIG. 9B, steps A and B are executed to detect a lateral acceleration a/g. When the detected lateral acceleration a/g becomes lower than the reference lateral acceleration a0/g, the communicating solenoid valves 27F and 27R are opened (step S73) to stop roll control.

Since the roll control operation is stopped when the lateral acceleration becomes smaller than the reference lateral acceleration, the vehicle body can be restored to the horizontal state even if the vehicle stops with the steering angle exceeding the reference angle $\theta 0$ after roll control is performed.

Figure 14A:
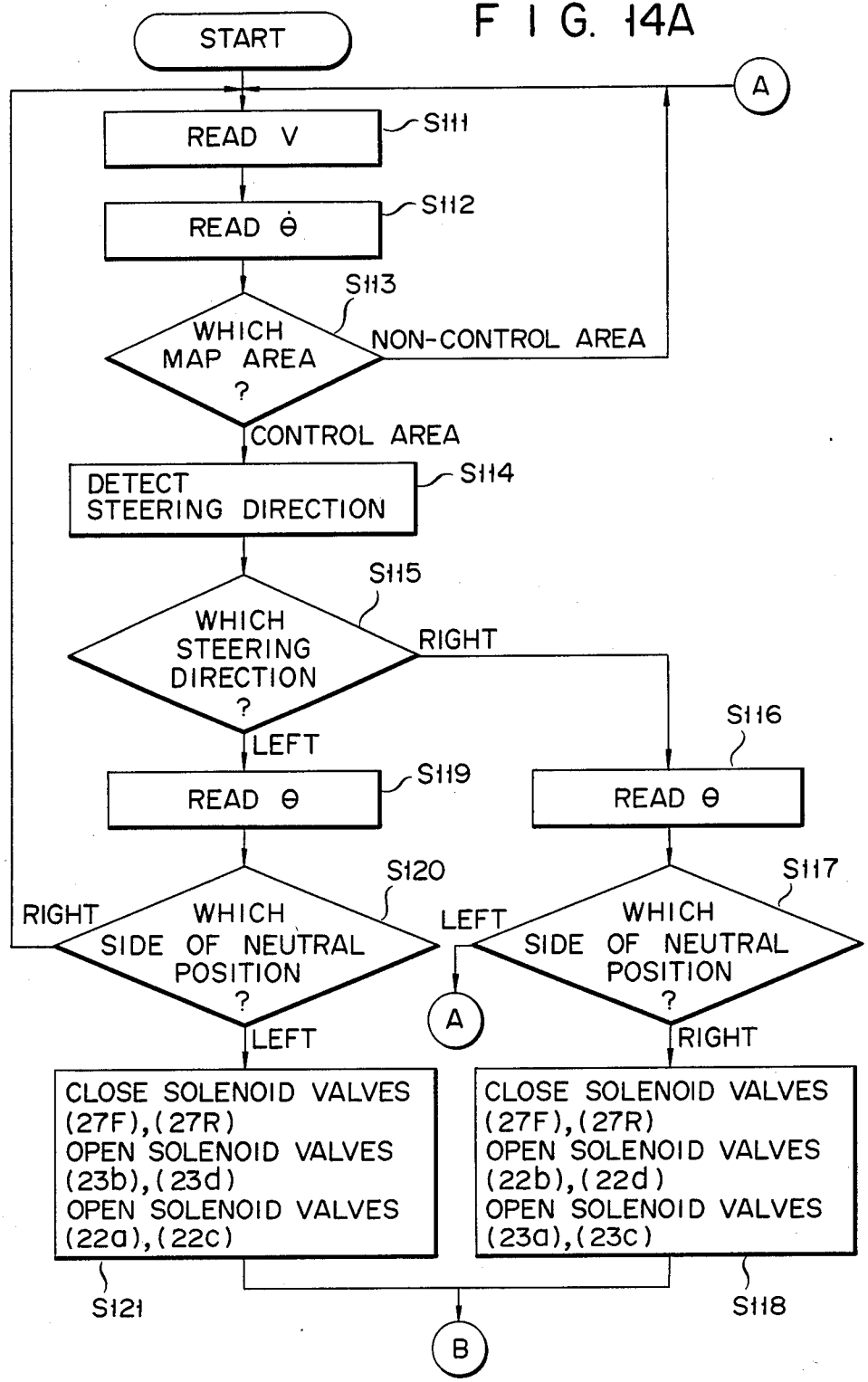
FIGS. 14A and 14B are flow charts for explaining the operation of a sixth embodiment of the present invention.
Figure 14B:
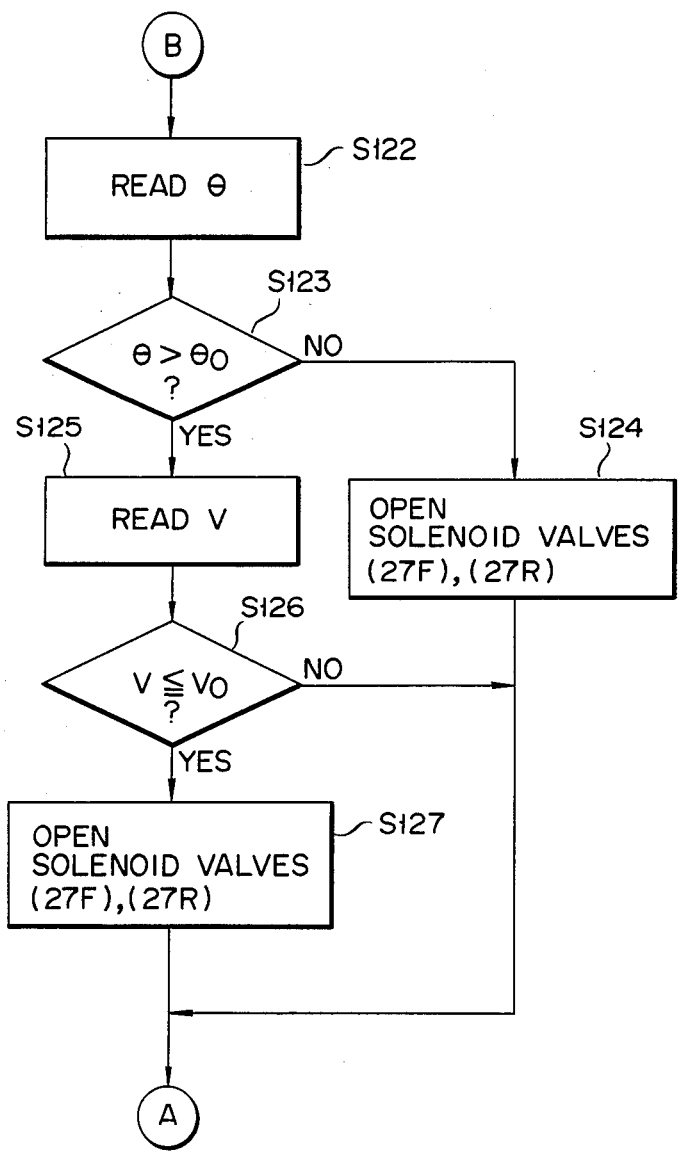

The operation of a sixth embodiment of the present invention will be described with reference to flow charts of FIGS. 14A and 14B. A case will be described in which the vehicle bod position is controlled when the steering wheel is turned clockwise. In step S111 of FIG. 14A, a velocity V detected by the velocity sensor 34 is fetched by the controller 16. In step S112, a steering angle $\theta$ detected by the steering sensor 30 is fetched by the controller 16. The control calculates a steering angular velocity $\dot{\theta}$, i.e., a change in the steering angle as a function of time. In step S113, the controller checks whether a current $V - \dot{\theta}$ belongs to a control area (the region subject to roll control) or a non-control area (the region which is not subject to roll control) with reference to the map for determining a time for opening the valves in response to the $V - \dot{\theta}$ (FIG. 3) stored in the controller 16 by using the velocity V and the angular velocity $\dot{\theta}$. When the current $V - \dot{\theta}$ is determined to belong to the control area in step S113, the flow advances to step S114. In step S114, a steering direction is detected in response to the signal from the steering sensor 30. In step S115, the steering direction is determined. In this case, since the steering wheel is turned clockwise, the flow advances to step S116. In step S116, the steering wheel position is detected in accordance with the signal from the steering sensor 30. In step S117, the controller 16 detects that the steering wheel is slightly rotated counterclockwise (left), and the flow returns to step S111. In this case, roll control is not performed. Thus, when the steering wheel is turned clockwise to the neutral position after being turned counterclockwise, vehicle position control is not performed. However, when the controller 16 detects that the steering wheel is slightly rotated clockwise (right), the flow advances to step S118. In step S118, the communicating solenoid valves 27F and 27R are closed in accordance with the control signal from the controller 16. The left wheel inlet solenoid valves 22b and 22d are opened for a predetermined period of time determined by the regions I to VII of FIG. 3, so thato the compressed air is supplied to the main control spring chambers 11b and 11d. In this case, the left suspension units $S_{FL}$ and $S_{RL}$ are biased to increase the left vehicle height. Ato the same time, the right wheel exhaust solenoid valves 23a and 23c are opened for a predetermined period of time determined by the regions I to VII of FIG. 3, so that the compressed air is exhausted from the right wheel main air spring chambers 11a and 11c, thereby biasing the right suspension units $S_{FR}$ and $S_{RR}$ to decrease the right vehicle height. Therefore, when the steering wheel is turned clockwise, the left vehicle height will not be decreased and the right vehicle height will not be increased, so that the vehicle body is maintained horizontally.

However, if the steering wheel is determined to be turned counterclockwise (left) in step S115, the flow advances to step S119, and the steering wheel position is detected in accordance with a signal from the steering sensor 30. If the controller detects in step S120 that the steering wheel is turned clockwise (right), the flow returns to step S111. In this case, vehicle position control will not be performed. Thus, when the steering wheel is turned clockwise to the neutral position immediately after it is turned counterclockwise, roll control is not performed. However, if the controller 16 detects in step S120 that the steering wheel is turned counterclockwise, the flow advances to step S121. In step S121, the communicating solenoid valves 27F and 27R are closed in response to the control signal from the controller 16. The left wheel exhaust solenoid valves 23b and 23d are opened for a predetermined period of time determined by the regions I to VII of FIG. 3, so that the compressed air is exhausted from the main air spring chambers 11b and 11d. Ato the same time, the right wheel inlet solenoid valves 23a and 23c are opened for a predetermined period of time determined by the regions I to VII of FIG. 3, so that the compressed air is supplied to the right wheel main air spring chambers 11a and 11c. Therefore, when the steering wheel is turned counterclockwise, the right vehicle height is prevented from decreasing, and the left vehicle height is restricted, thereby maintaining the vehicle body horizontally.

After the above-mentioned vehicle position control is performed, the flow advances to step S122. In step S122, a steering angle $\dot{\theta}$ is detected in accordance with a signal from the steering sensor 30. Subsequently, in step S123, the controller 16 checks whether or noto the steering angle $\theta$ is larger than the reference steering angle $\theta 0$ (e.g., ±15 degrees). If NO in step S123, the flow advances to step S124, and the solenoid valves 27F and 27R are opened. Thereafter, the flow returns to step S111. In other words, roll control is cancelled.

However, if YES in step S123, the flow advances to step S125, and a velocity V detected by the velocity sensor 34 is fetched by the controller 16. The controller 16 then checks in step S126 whether or not the velocity V is equal to or smaller than the reference velocity V0 (e.g., 20 km/h). If YES in step S126, the flow advances to step S127 to open the solenoid valves 27F and 27R, so that the front main air spring chambers 11a and 11b communicate with each other and the rear main air spring chambers 11c and 11d communicate with each other. However, if NO in step S126, the flow returns to step S111. Therefore, the vehicle position control performed in steps S118 and S121 is cancelled when the steering angle $\theta$ is smaller than the reference angle $\theta 0$ or when the velocity V is lower than the reference velocity V0.

The roll control quantity, i.e., valve ON/OFF time given by the $V - \dot{\theta}$ map is determined in the manner described above. Therefore, optimal roll control can be performed by taking into consideration the velocity and steering angular velocity during rapid turning of the vehicle. And an unnecessary roll control can be prevented because roll control is not performed if the steering wheel is turned back to the neutral position.

Figure 15A:
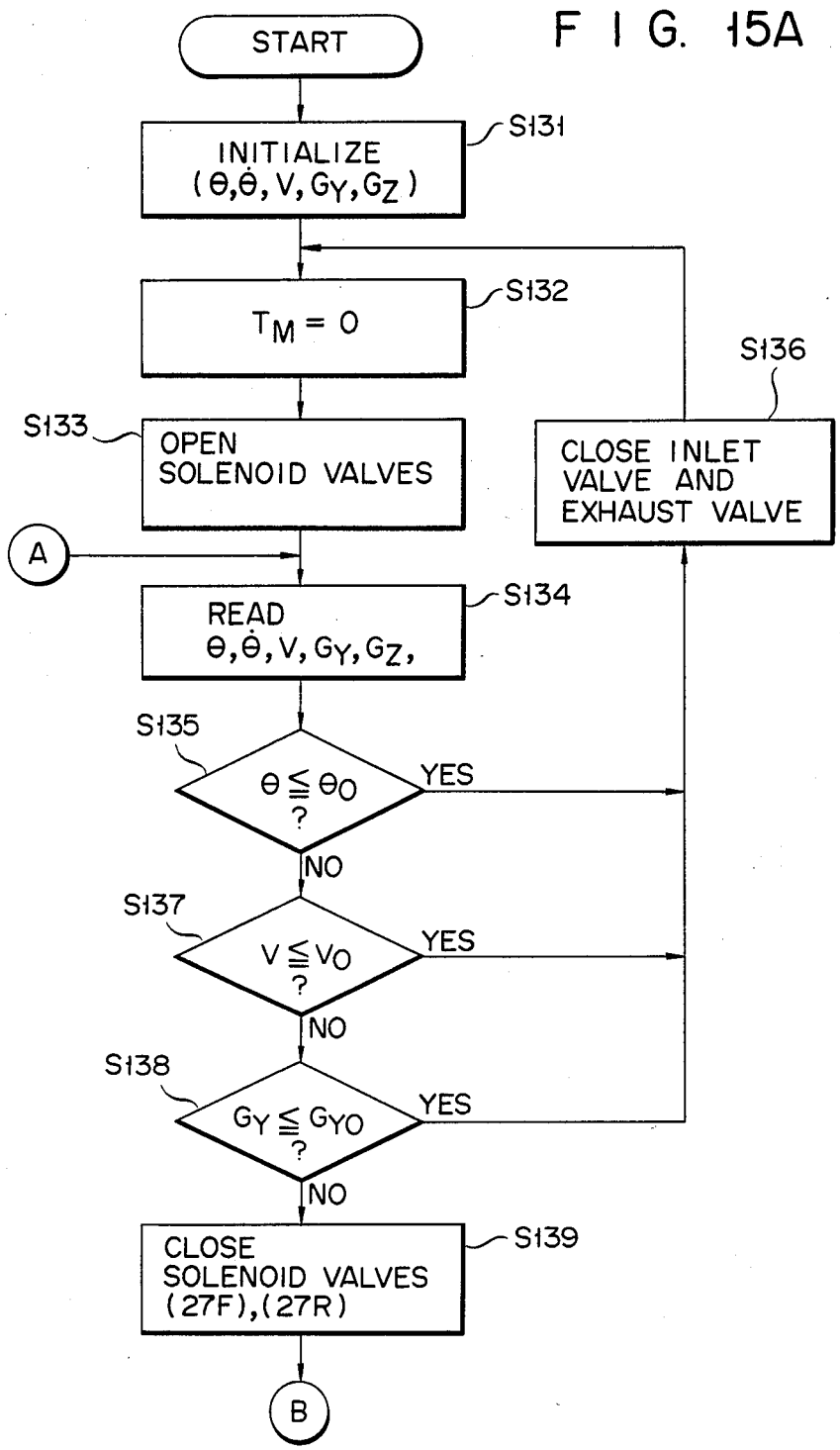
FIGS. 15A and 15B are flow charts for explaining the operation of a seventh embodiment of the present invention.
Figure 15B:
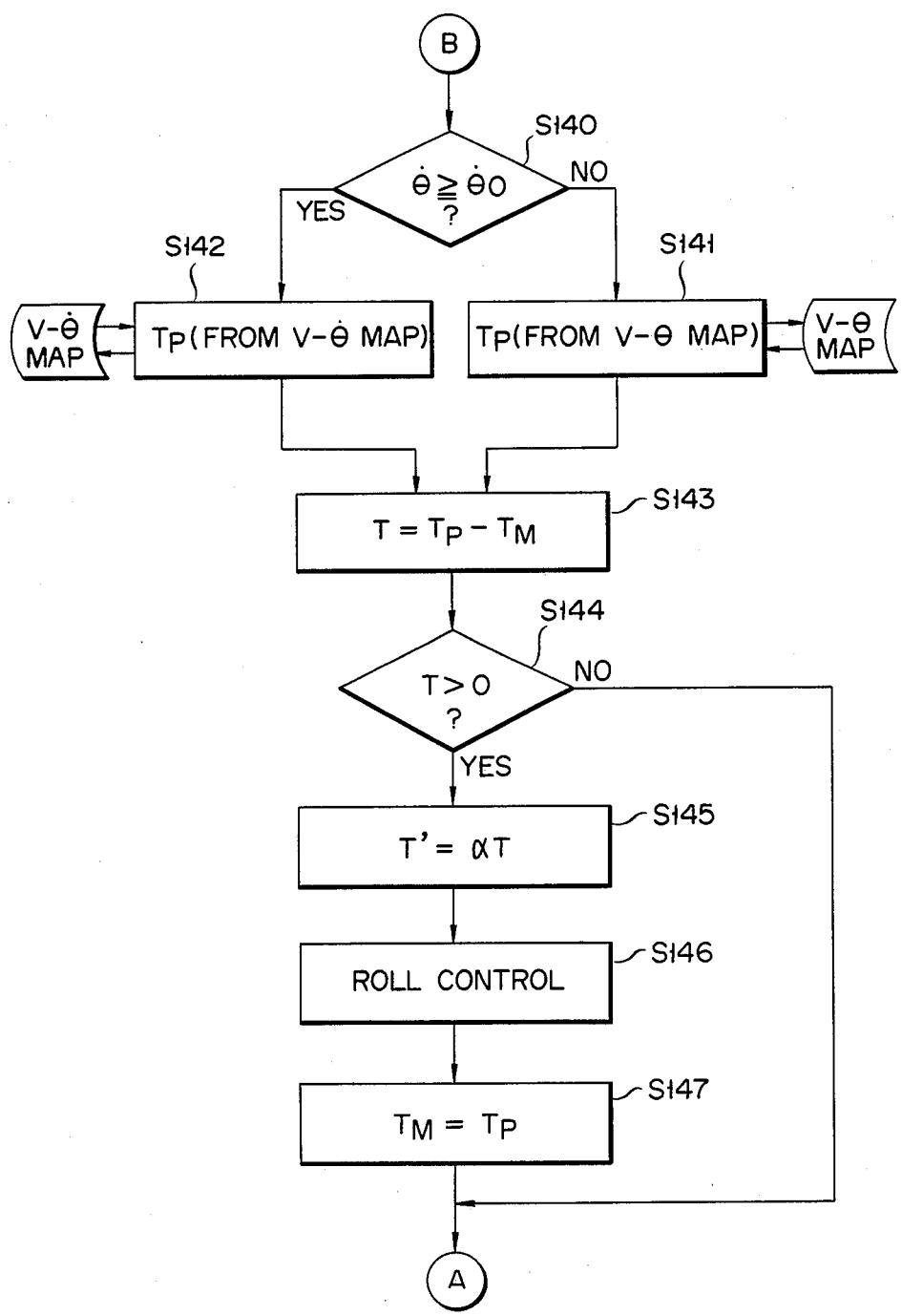

The operation of a seventh embodiment of the present invention will be described with reference to the flow charts of FIGS. 15A and 15B. When the driver turns on the ignition, the controller 16 starts the operation in accordance with the flow charts of FIGS. 15A and 15B. In step S131, the predetermined memory area of the controller 16 which stores the steering angle $\theta$, the steering angular velocity $\dot{\theta}$, the velocity V, the vertical acceleration $G_Z$, and the horizontal acceleration $G_Y$ along the widthwise direction of the vehicle body is cleared. In step S132, the map memory $T_M$ is reset ($T_M=0$). In step S133, the controller 16 checks that the communicating solenoid valves 27F and 27R are open. In step S134, the steering angle detected by the steering sensor 30 is supplied to the controller 16. The controller 16 calculates the steering angular velocity $\dot{\theta}$, i.e., a change in steering angle as a function of time. Furthermore, the velocity V detected by the velocity sensor 34 and the accelerations $G_Y$ and $G_Z$ detected by the acceleration sensor 33 are fetched by the controller 16. The controller 16 then checks in step S135 whether or not the steering angle $\theta$ corresponds to the neutral position, i.e., condition $\theta \leq \theta 0$ is established where $\theta 0$ is the reference angle. Here the neutral position indicates that the steering wheel is not turned clockwise or counterclockwise over the reference angle. If YES in step S135, the flow advances to step S136. In step S136, the controller 16 checks that the inlet solenoid valves 22a to 22d and the exhaust solenoid valves 23a to 23d are closed. In this case, if the valves are not closed, they are closed under the control of the controller 16.

However, if NO in step S135, the flow advances to step S137. The controller 16 checks in step S137 whether or not the velocity V is equal to or lower than the reference velocity V0. If YES in step S137, the flow advances to step S136. However, if NO in step S137, the flow advances to step S138. The controller 16 checks in step S138 whether or not the horizontal acceleration $G_Y$ is equal to or smaller than a reference acceleration $G_{Y0}$. If YES in step S138, the flow returns to step S136.

However, if NO in step S138, roll control after step S139 is started. More particularly, roll control after step S138 is performed when the steering angle is larger than the reference steering angle $\theta 0$, the velocity V is larger than the reference velocity V0, and the acceleration $G_Y$ is larger than the reference acceleration $G_{Y0}$. In step S139, the solenoid valves 27F and 27R are closed under the control of the controller 16. The controller 16 then checks in step S140 whether or not the steering angular velocity is equal to or larger than the reference steering angular velocity $\dot{\theta}0$. If NO in step S140, the flow advances to step S141. In step S141, the controller 16 calculates a control time $T_P$ (i.e., a time for opening the solenoid valves) in accordance with a $V-\theta$ map (FIG. 8) by using the steering angle $\theta$ and the velocity V. The control time $T_P$ is determined in accordance with regions I to VII of the $V-\theta$ map of FIG. 8 and is represented in parentheses.

If YES in step S140, the flow advances to step S142. In step S142, a control time $T_P$ (i.e., a time for opening the solenoid valves) is calculated in accordance with $V-\dot{\theta}$ map (FIG. 3) by using the steering angular velocity and the velocity V. This control time $T_P$ is determined by regions I to VII of $V-\dot{\theta}$ map of FIG. 3 and is represented in parentheses. When step S141 or S142 is completed, the flow advances to step S143 wherein a control time T ($=T_P-T_M$) is calculated. The controller 16 checks in step S144 whether or not condition T>0 is established. If NO in step S144, the flow returns to step S134. In this case, roll control is not performed. However, if YES in step S144, the flow advances to step S145. In step S145, the control time T obtained in step S143 is corrected. More particularly, a correction coefficient $\alpha$ is multiplied with the control time T to obtain the actual control time T'. This correction is performed for the following reason. When the internal pressures of the main air spring chambers 11a to 11d are kept high, it takes a long period of time to supply the compressed air from the reserve tank 20F (20R) to the main air spring chambers 11a to 11d. In addition, when the internal pressures of the reserve tanks 20F and 20R are kept high, the amount of compressed air supplied to the air spring chambers is increased when the inlet solenoid valves 22a to 22d are opened for the same predetermined period of time as in the case wherein the internal pressures of the reserve tanks 20F and 20R are kept low. In this manner, the correction coefficient is determined in accordance with the internal pressures of the main air spring chambers 11a to 11d and the reserve tank 20F (20R). In step S146, the inlet solenoid valves 22a to 22d and the exhaust solenoid valves 23a to 23d are opened for the control time T' under the control of the controller 16, thereby performing roll control. For example, when the steering wheel is turned clockwise, the left wheel inlet solenoid valves 22b and 22d are opened for the control time T' to supply the compressed air to the main air spring chambers 11b and 11d under the control of the controller 16. In this case, the left suspension units $S_{FL}$ and $S_{RL}$ are biased to increase the left vehicle height. At the same time, the right wheel exhaust solenoid valves 23a and 23c are opened for the control time T' to exhaust the compressed air from the right wheel main air spring chambers 11a and 11c under the control of the controller 16, thereby biasing the right suspension units $S_{FR}$ and $S_{RR}$ to decrease the right vehicle height. In this manner, when the steering wheel is turned clockwise, the left vehicle height will not be decreased, and the right vehicle height will not be increased, thereby maintaining the vehicle body horizontally.

When the operation in step S146 is completed, the flow advances to step S147, wherein the map memory is updated, i.e., let $T_M$ be $T_P$. The flow then returns to step S134. When any one of steps S135, S137 and S138 is determined to be YES, the flow advances to step S133 through step S136. The communicating solenoid valves 27F and 27R are opened to cancel roll control.

Roll control is cancelled when the steering wheel is returned to the neutral position, the velocity becomes lower than the reference velocity VO, or the horizontal acceleration $G_Y$ becomes lower than the reference acceleration $G_{Y0}$. Even if the velocity or the acceleration $G_Y$ is larger than the corresponding reference value, roll control can be properly cancelled when the steering wheel returns to the neutral position.

An eighth embodiment of the present invention will be described with reference to flow charts of FIGS. 16A and 16B. When a driver turns on the ignition, the controller 16 performs the operation in accordance with the flow charts of FIGS. 16A and 16B. In step S151, a predetermined memory area of the controller 16 which stores a steering angle $\theta$, a steering angular velocity $\dot{\theta}$ and a velocity V is cleared. In step S152, a map memory $T_M$ is reset ($T_M=0$). In step S153, the controller 16 checks that the solenoid valves 27F and 27R are open. In step S154, a steering angle $\theta$ detected by the steering sensor 30 is fetched by the controller 16. The controller 16 calculates the steering angular velocity $\dot{\theta}$, i.e., a change in steering angle as a function of time. A velocity V detected by the velocity sensor 34 is fetched by the controller 16. The controller 16 checks in step S155 whether or not the steering angle $\theta$ corresponds to a neutral position of the steering wheel, i.e., condition $\theta \leq \theta 0$ is established where $\theta$ is a predetermined angle. Here, the neutral position indicates that the steering wheel is not turned clockwise or counterclockwise past the predetermined angle $\theta$. If YES in step S155, the flow advances to step S156. In step S156, the controller 16 checks that the inlet solenoid valves 22a to 22d and the exhaust solenoid valves 23a to 23d are closed. In this case, if the solenoid valves are not closed, they are closed under the control of the controller 16.

However, if NO in step S155, roll control operation beginning with step S157 is performed. In step S157, the solenoid valves 27F and 27R are closed under the control of the controller 16. The controller then checks in step S158 whether or not the steering angular velocity $\dot{\theta}$ is equal to or larger than the reference angular velocity $\dot{\theta}0$. If NO in step S158, the flow advances to step S159. In step S159, a control time $T_P$ (i.e., a time for opening the solenoid valves) is calculated in accordance with the graph of FIG. 8 by using the steering angle and the velocity. The control time $T_P$ is determined in accordance with regions I to VII of the graph of FIG. 8 and is represented in parentheses.

If YES in step S158, the flow advances to step S160. In step S160, a control time $T_P$ (i.e., a time for opening the solenoid valves) is calculated in accordance with $V-\dot{\theta}$ map of FIG. 3 by using the steering angular velocity $\dot{\theta}$ and the velocity V. The control time $T_P$ is determined by regions I to VII of the $V-\dot{\theta}$ map of FIG. 3 and is represented in parentheses. When step S159 or S160 is completed, the flow advances to step S161 wherein a control time T ($=T_P-T_M$) is calculated. The controller 16 checks in step S162 whether or not condition $T>0$ is established. If NO in step S162, the flow returns to step S152. In this case, the roll control operation is not performed. However, if YES in step S162, the flow advances to step S163. In step S163, the controller 16 controls the solenoid valves 22a to 22d and 23a to 23d in accordance with the control time T, thereby performing roll control. For example, when the steering wheel is turned clockwise, the left solenoid valves 22b and 22d are opened for the control time T by the controller 16, so that compressed air is supplied to the main air spring chambers 11b and 11d and the left suspension units $S_{FL}$ and $S_{RL}$ are biased to increase the left vehicle height. At the same time, the right solenoid valves 23a and 23c are opened for the control time T by the controller 16, so that the compressed air is exhausted from the main air spring chambers 11a and 11c, thereby biasing the right suspension units $S_{FR}$ and $S_{RR}$ to decrease the right vehicle height. In other words, when the steering wheel is turned clockwise, a decrease in the left vehicle height and an increase in the right vehicle height are reduced to prevent rolling of the vehicle.

When the operation in step S163 is completed, the flow advances to step S164 wherein the map memory is updated. In other words, let $T_M$ be $T_P$, and the flow returns to step S154 again. When the steering wheel is returned to the neutral position, the flow advances to step S153 through step S156. In step S153, the communicating solenoid valves 27F and 27R are opened to cause the right main air spring chambers to communicate with the left main air spring chambers, thereby cancelling roll control.

As mentioned above, the steering angular velocity is detected to determine whether it exceeds the reference angular velocity so as to detect normal or rapid turning. When turning is normal, the control time T is calculated in accordance with the $V-\theta$ map, so that roll control is slowly performed. However, when turning becomes rapid, the control time T is calculated in accordance with the $V-\dot{\theta}$ map, thereby providing optimal roll control.

Figure 17B:
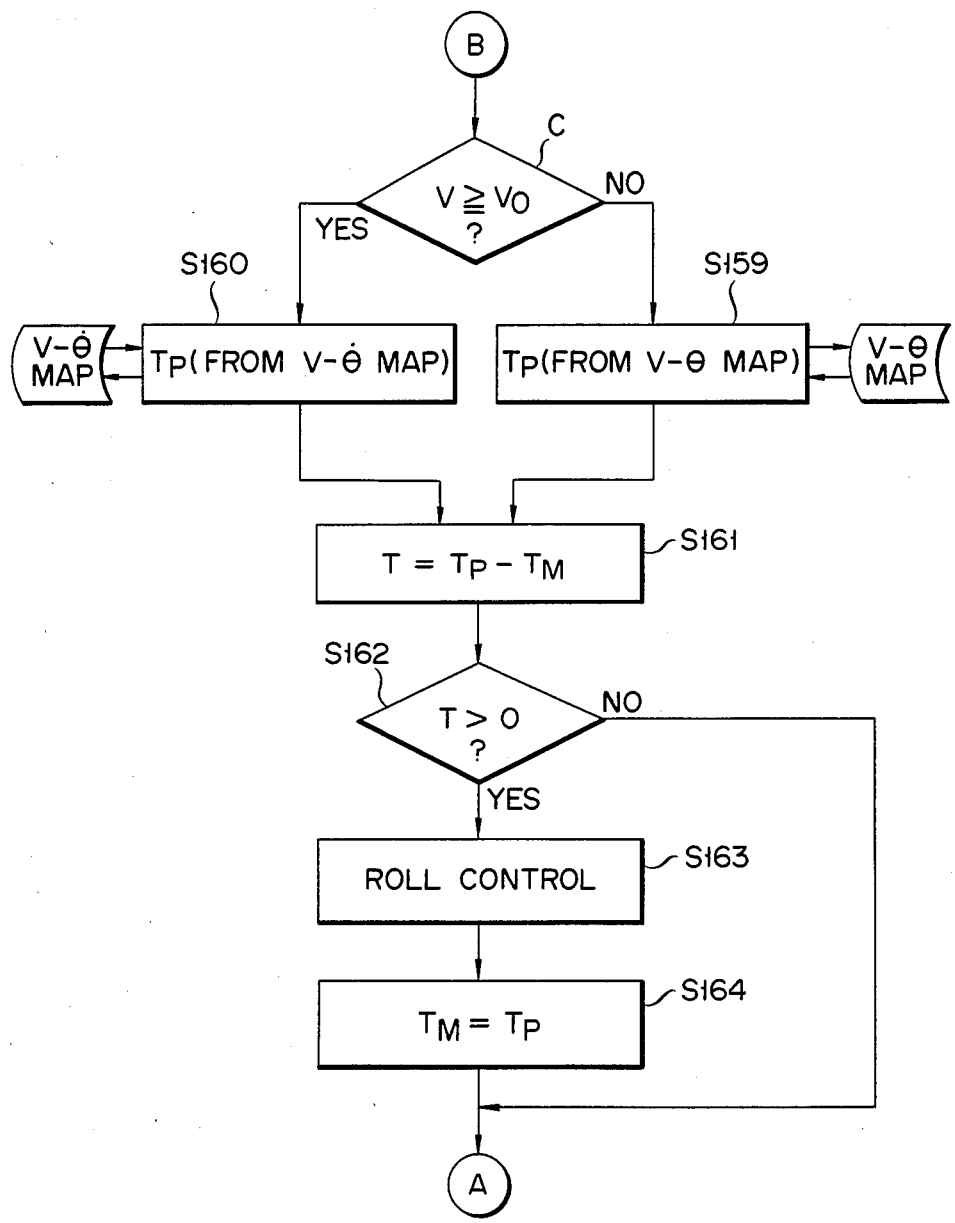

A ninth embodiment of the present invention will be described with reference to flow charts of FIGS. 17A and 17B. In the ninth embodiment, the operation in step S158 of the eighth embodiment (FIGS. 16A and 16B) is replaced with step C. The controller 16 checks in step C whether or not the velocity V is equal to or higher than the reference velocity VO. If YES in step C, i.e., when the controller 16 detects that the high-speed operation is performed, the flow advances to step S160. In step S160, a control time $T_P$ is calculated in accordance with the $V-\dot{\theta}$ map. However, if NO in step C, i.e., when the controller 16 detects that the low-speed operation is performed, the flow advances to step S159. A control time is calculated in accordance with the $V-\theta$ map, In this manner, when low-speed turning is performed, the control time T is calculated in accordance with the $V-\theta$ map so as to provide relatively slow roll control. However, when high-speed turning is performed, the control time T is calculated in accordance with the $V-\dot{\theta}$ map, thereby providing relatively high-speed roll control. Therefore, the vehicle body can be optimally roll-controlled in both high- and low-speed turning.

Figure 19:
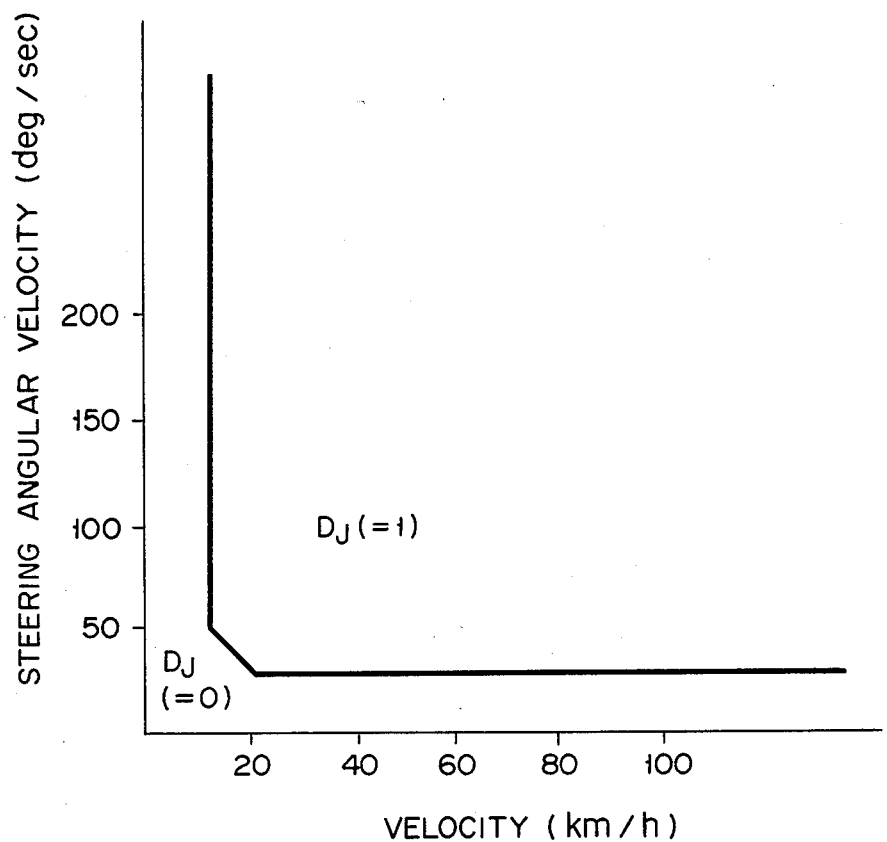
FIG. 19 is a graph for explaining the steering angular velocity as a function of the velocity.

The operation of a tenth embodiment of the present invention will be described with reference to flow charts of FIGS. 18A and 18B. In the tenth embodiment, step D is added after step S157 of the eighth embodiment (FIGS. 16A and 16B). A value $D_J$ calculated in step D is discriminated in step E. More particularly, the value $D_J$ is calculated in step D in accordance with a first $V-\dot{\theta}$ map of FIG. 19 by using the steering angular velocity $\dot{\theta}$ and the velocity V. When the controller 16 then checks in step E that condition $D_J=0$ has been established, the flow advances to step S159. In step S159, a control time $T_P$ (i.e., a time for opening the solenoid valves) is calculated in accordance with the $V-\theta$ map of FIG. 8 by using the steering angle and the velocity V. This control time $T_P$ is determined in accordance with the regions I to VII of the $V-\theta$ map of FIG. 8, and is represented in parentheses.

However, when the controller 16 discriminates in step E that condition $D_J=1$ has been established, the flow advances to step F. A control time $T_P$ (i.e., a time for opening the solenoid valves) is calculated in accordance with a second $V-\dot{\theta}$ map of FIG. 3 by using the steering angular velocity $\dot{\theta}$ and the velocity V. This control time $T_P$ is determined by regions I to VII of the second $V-\theta$ map of FIG. 3, and is represented in parentheses. When step S159 or F has been completed, the flow advances to step S161 wherein a control time T ($=T_P-T_M$) will be calculated. The same roll control operation as described above will be performed for the control time T.

In this manner, normal turning and rapid turning are detected to determine to which one of the regions of the first $V-\theta$ map the current velocity V and the current steering angular velocity $\dot{\theta}$ correspond. When low-speed turning is performed, the control time T is calculated in accordance with the $V-\theta$ map so as to provide relatively moderate roll control. However, when high-speed turning is performed, the control time T is calculated in accordance with the second $V-\dot{\theta}$ map, thereby providing relatively high-speed roll control. Therefore, the vehicle body can be optimally roll-controlled in both high-and low-speed turning.

Figure 20B:
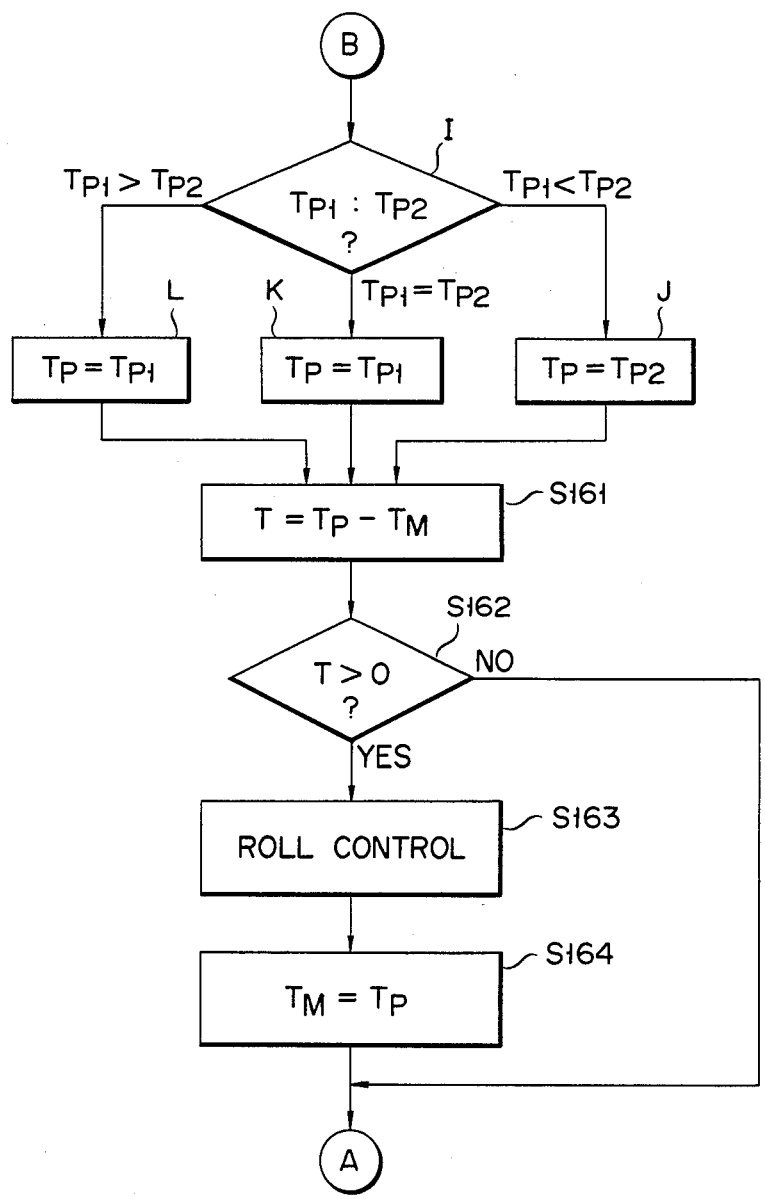

The operation of an eleventh embodiment of the present invention will be described with reference to flow charts of FIGS. 20A and 20B. In the eleventh embodiment, steps G and H are added after step S157 of the eighth embodiment (FIGS. 16A and 16B). In step I, the controller 16 compares a control time $T_{P1}$ calculated in step G with a control time $T_{P2}$ calculated in step H. The longer of the control times $T_{P1}$ and $T_{P2}$ is detected as the control time $T_P$ in steps J to L. In step G, the control time $T_{P1}$ (i e., a time for opening the solenoid valves) is calculated in accordance with the $V-\theta$ map of FIG. 8 by using the steering angle $\theta$ and the velocity V. The control time $T_{P1}$ is determined by the regions I to VII of the $V-\theta$ map of FIG. 8, and is represented in parentheses. In step H, the control time $T_{P2}$ (i.e., a time for opening the solenoid valves) is calculated in accordance with the $V-\dot{\theta}$ map of FIG. 3 by using the steering angular velocity $\dot{\theta}$ and the velocity V. The control time $T_{P2}$ is determined by the regions I to VII of the $V-\dot{\theta}$ map of FIG. 3, and is represented in parentheses. The control time $T_{P1}$ is compared with the control time $T_{P2}$ in step I. When the controller 16 determines in step I that condition $T_{P1} < T_{P2}$ has been established, the flow advances to step J. In step J, let $T_P$ be $T_{P2}$. When the controller 16 determines in step I that condition $T_{P1} = T_{P2}$ has been established, the flow advances to step K. In step K, let $T_P$ be $T_{P1}$. However, when the controller 16 determines in step I that condition $T_{P1} > T_{P2}$ has been established, the flow advances to step L. In step L, let $T_P$ be $T_{P1}$. When any one of the steps J to L has been completed, the flow advances to step S161 wherein a control time T ($=T_P-T_M$) will be calculated. The same roll control operation as described above will be performed for the control time T.

In this manner, vehicle roll control is performed for the longer of the control times given by the $V-\theta$ map and the control time given by the $V-\dot{\theta}$ map. Therefore, proper roll control can be performed in both normal and rapid turning.

A twelfth embodiment of the present invention will be described with reference to FIGS. 21 to 23. Referring to FIG. 21, reference symbol $S_{FR}$ denotes a right front wheel suspension unit; $S_{FL}$, a left front wheel suspension unit; $S_{RR}$, a right rear wheel suspension unit; and $S_{RL}$, a left rear wheel suspension unit. The suspension units $S_{FR}$, $S_{FL}$, $S_{RR}$ and $S_{RL}$ comprise main air spring chambers 111a to 111d, sub-air spring chambers 112a to 112d, shock absorbers 113a to 113d, and coil springs (not shown) serving as auxiliary springs, respectively. Reference numeral 114 denotes a compressor. The compressor 114 compresses atmospheric air supplied from an air cleaner (not shown) and supplies compressed air to a reserve tank 117 through a check valve 115 and a drier 116. The drier 116 dries the compressed air using silica gel or the like.

The compressed air stored in the reserve tank 117 is supplied to the main air spring chamber 111a through an inlet path selecting solenoid valve 118a and an inlet solenoid valve 119a which are arranged along a piping A1. The compressed air is also supplied to the main air spring chamber 111b through the inlet path selecting solenoid valve 118a and an inlet solenoid valve 119b. The compressed air is also supplied to the main air spring chamber 111c through an inlet path selecting solenoid valve 118b and an inlet solenoid valve 119c which are arranged along a piping A2. Finally, the compressed air is supplied to the main air spring chamber 111d through the inlet path selecting solenoid 118b and the inlet solenoid valve 119d. In this case, the inlet path selecting solenoid valves 118a and 118b have the same construction. The solenoid valves 118a and 118b can select a large or small compressed air path by detecting whether or not the corresponding solenoid is energized.

The compressed air from the main air spring chambers 111a to 111d is exhausted to the atmosphere through air exhaust solenoid valves 120a to 120d and an exhaust pipe 121.

The main air spring chambers 111a and 111b are coupled to each other through a communicating solenoid valve 122a, a communicating pipe B and a communicating solenoid valve 122b. The communicating solenoid valve 122a controls communication between the main and sub-air spring chambers 111a and 112a. Similarly, the communicating solenoid valve 122b controls communication between the main and sub-air spring chambers 111b and 112b. The main air spring chambers 111c and 111d are coupled to each other through a communicating solenoid valve 122c, a communicating pipe C and a communicating solenoid valve 122d. The solenoid valve 122c controls communication between the main and sub-air spring chambers 111c and 112c. Similarly, the solenoid valve 122d controls communication between the main and sub-air spring chambers 111d and 112d.

It should be noted that the inlet solenoid valves 119a to 119d and the exhaust solenoid valves 120a to 120d comprise normally closed valves, and that the communicating solenoid valves 112a to 112d comprise normally open valves.

When the solenoid coils of the valves 118a and 118b are energized, the valves 118a and 118b close the large-diameter path and open only the small-diameter path to allow a small amount of compressed air per unit time to flow through the small-diameter path. However, when the solenoid coils are deenergized, both the large- and small-diameter paths are opened to allow a large amount of compressed air per unit time to flow therethrough.

Reference numerals 123a and 123b denote pressure sensors arranged in the reserve tank 117. When the internal pressure of the reserve tank 117 is decreased below the reference pressure, the compressor 114 is started in response to a signal from the pressure sensor 123a. When the internal pressure of the reserve tank 117 rises above the reference pressure, the compressor 114 is stopped in response to a signal from the pressure sensor 123a.

The pressure sensor 123b constantly detects the internal pressure of the reserve tank 117. An internal pressure detection signal is supplied to a controller 124.

Reference numeral 125 denotes a reserve tank water drainage solenoid valve. Reference numerals 126a to 126d denote main tank pressure sensors arranged in the main air spring chambers 111a to 111d, respectively. The pressure sensors 126a to 126d constantly detect the internal pressures of the main air spring chambers 111a to 111d, respectively. Detection signals from the sensors 126a to 126d are supplied to the controller 124.

It should be noted that the solenoid valves 118a, 118b, 119a to 119d, 120a to 120d, 122a to 122d and 125 are controlled in response to control signals from the controller 124.

Reference numeral 130 denotes a steering sensor for detecting a steering angle; 131, an acceleration sensor for detecting a longitudinal acceleration, a lateral acceleration and a vertical acceleration; 132, a velocity sensor for detecting a velocity; 133, a front height sensor for detecting a front height (front body portion height) of the vehicle body; and 134, a rear height sensor for detecting a rear height (rear body portion height). Signals from the sensors 130 and 134 are supplied to the controller 124.

Figure 22A:
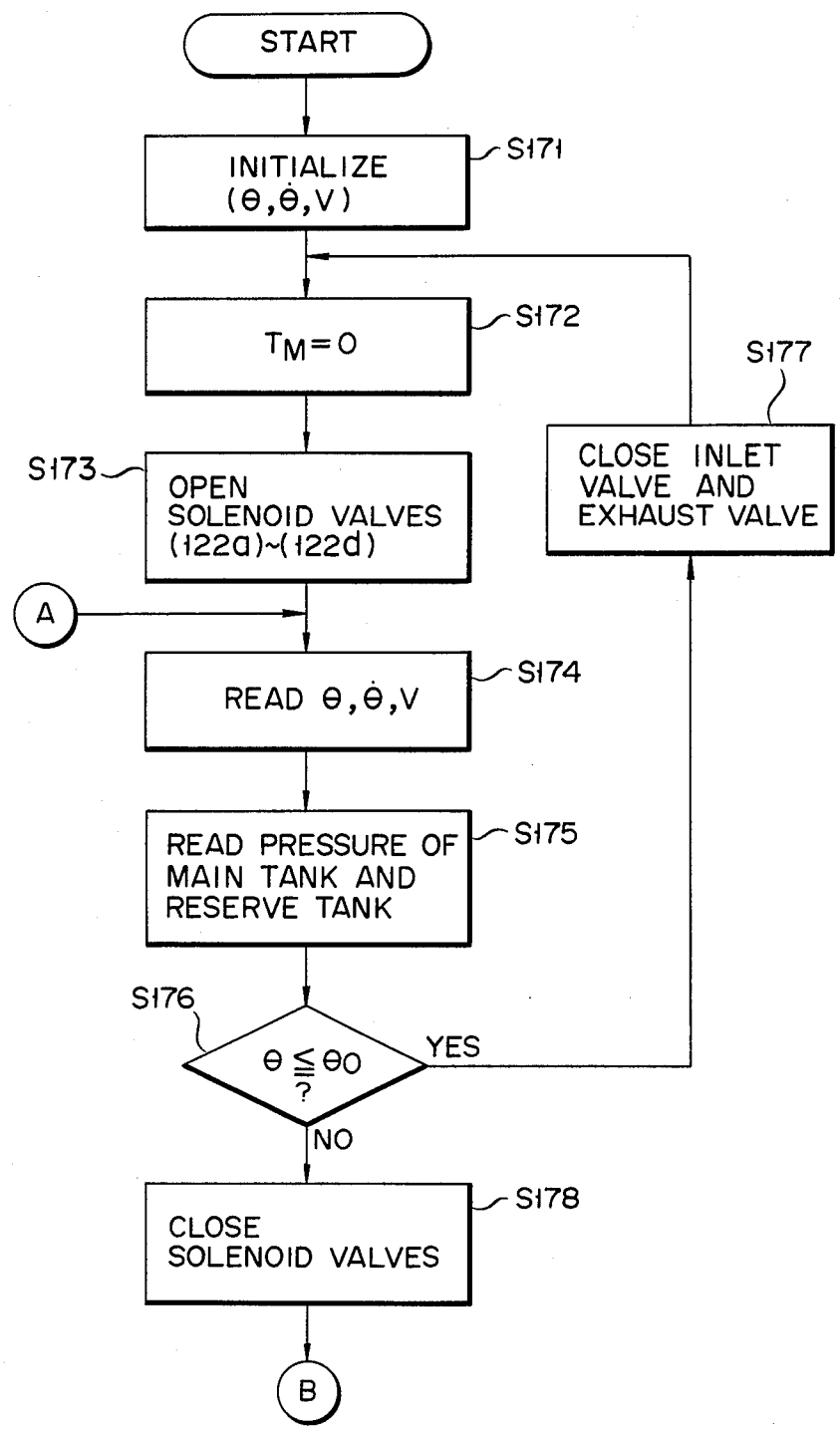

The operation of the apparatus having the construction described above will be described with reference to the flow charts of FIGS. 22A and 22B. When a driver turns on the ignition, the controller 124 performs the operation in accordance with the flow charts of FIGS. 22A and 22B. In step S171, a predetermined memory area of the controller 124, which stores the steering angle $\theta$, the steering angular velocity $\dot{\theta}$ and the velocity V, is cleared. In step S172, the map memory $T_M$ is reset ($T_M=0$). In step S173, the controller 124 checks that the communicating solenoid valves 122a to 122d are open. However, if these solenoid valves are closed, they are opened under the control of the controller 124. The steering angle $\theta$ detected by the steering sensor 130 is fetched by the controller 124 in step S174. The controller 124 calculates the steering angular velocity, i.e., a change in the steering angle as a function of time. Furthermore, the velocity V detected by the velocity sensor 132 is fetched by the controller 124. In step S175, the internal pressure data detected by the pressure sensors 126a to 126d for the main air spring chambers 111a to 111d and by the pressure sensor 123b for the reserve tank 117 are also fetched by the controller 124. The controller 124 then checks in step S176 whether or not the steering angle corresponds to the neutral steering wheel position, i.e., the condition $\theta \leq \theta 0$ is established. Here the neutral position indicates that the steering wheel is not turned clockwise or counterclockwise over the reference angle $\theta 0$. If YES in step S176, the flow advances to step S177. In step S177, the controller 124 checks that the inlet solenoid valves 119a to 119d and the exhaust solenoid valves 120a to 120d are closed. However, if these valves are not closed, they are closed under the control of the controller 124.

However, if NO in step S176, the roll control is started after step S17S. More particularly, in step S178, the communicating solenoid valves 122a to 122d are closed under the control of the controller 124. In step S179, a control time $T_P$ (i.e., a time for opening the solenoid valves) is calculated in accordance with the $V-\dot{\theta}$ map of FIG. 3 by using the steering angular velocity $\dot{\theta}$ and the velocity V. This control time $T_P$ is determined by the regions I to VII of the $V-\theta$ map of FIG. 3, and is represented in parentheses.

Figure 23:
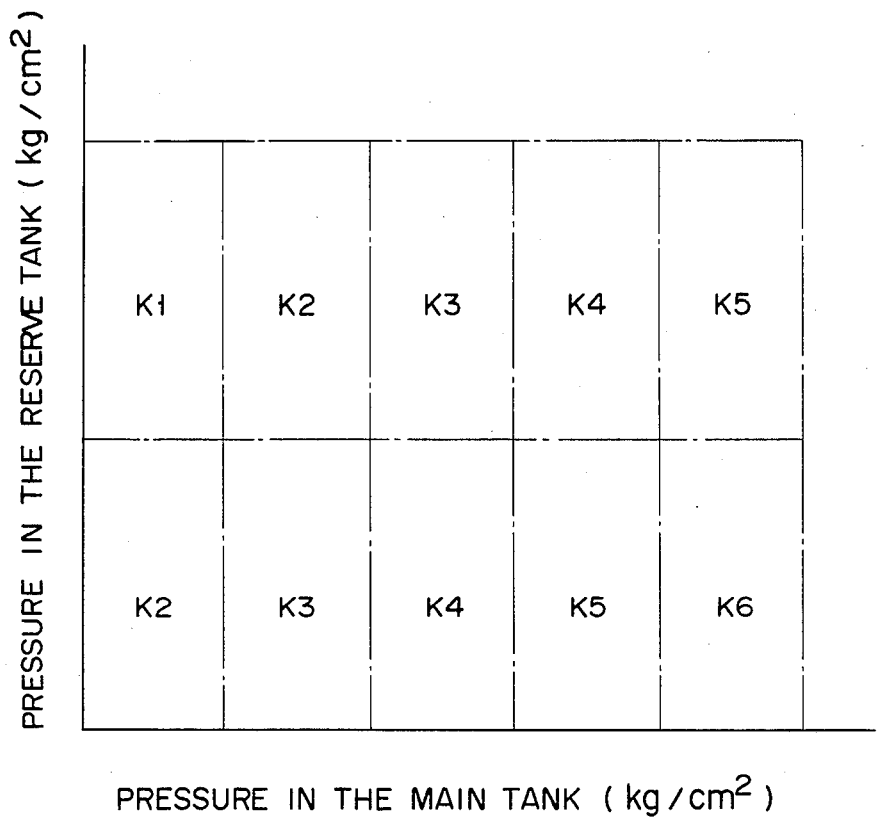
FIG. 23 is a graph explaining the pressure in the reserve tank as a function of the pressure in the main tank.

In step S180, a correction coefficient $K_P$ is calculated in accordance with a main tank internal pressure-reserve tank internal pressure map (an M-R map) of FIG. 23 by using the internal pressures of the main air spring chambers 111a to 111d and the reserve tank 117. A correction value for the control time $T_P$ is calculated in accordance with the internal pressures of the main air spring chambers 111a to 111d and the reserve tank 117. The correction coefficient $K_P$ is determined in accordance with K1 to K6 in FIG. 23.

When steps S179 and S180 have been completed, the flow advances to step S181 wherein a control time T ($=T_P \times K_P - T_M$) will be calculated. The controller 124 then checks in step S182 whether or not condition $T>0$ has been established. If NO in step S182, the flow returns to step S174. In this case, roll control is not performed. However, if YES in step S182, the flow advances to step S183. In step S183, the inlet solenoid valves 119a to 119d and the exhaust solenoid valves 120a to 120d are opened for the corrected control time T to perform roll control. For example, when the steering wheel is turned clockwise, the left wheel inlet solenoid valves 119b and 119d are opened for the control time T to supply the compressed air to the main air spring chambers 111b and 111d under the control of the controller 124. In this case, the left suspension units $S_{FL}$ and $S_{RL}$ are biased to increase the left height. At the same time, the right wheel exhaust solenoid valves 120a and 120c are opened for the control time T to exhaust the compressed air from the right wheel main air spring chambers 111a and 111c under the control of the controller 124, thereby biasing the right suspension units $S_{FR}$ and $S_{RR}$ to decrease the right vehicle height. Therefore, when the steering wheel is turned clockwise, the left height will not be decreased and the right height will not be increased, thereby maintaining the vehicle body horizontally.

In this case, the control time $T_P$ calculated in step S179 is corrected in accordance with the correction coefficient $K_P$ corresponding to the internal pressures of the main air spring chambers 111a to 111d and the reserve tank 117. The compressed air is supplied from the reserve tank 117 to the main air spring chambers 111a to 111d for the corrected control time T, thereby providing optimal roll control. For example, when the internal pressures of the main air spring chambers 111a to 111d are relatively high and the compressed air cannot be easily supplied thereto, or when the internal pressure of the reserve tank 117 is relatively low and the compressed air cannot be easily supplied therefrom, the internal pressures of the main air spring chambers 111a to 111d can be properly corrected as target internal pressures.

When the operation in step S183 has been completed, the flow advances to step S184 wherein the map memory is updated, i.e., let $T_M$ be $T_P \times K_P$.

In this way, roll control of a vehicle can be performed according to the solenoid valve ON time given by the $V-\dot{\theta}$ map. Therefore, the control time can be corrected in accordance with the correction coefficient obtained by the M-R map. The internal pressures of the main air spring chambers can be adjusted as the target pressures without being influenced by the internal pressures of the main air spring chambers and the reserve tank, which are obtained prior to roll control. Therefore, optimal roll control can be performed, and hence rolling of the vehicle is prevented, which greatly improves steering stability.

Figure 24A:
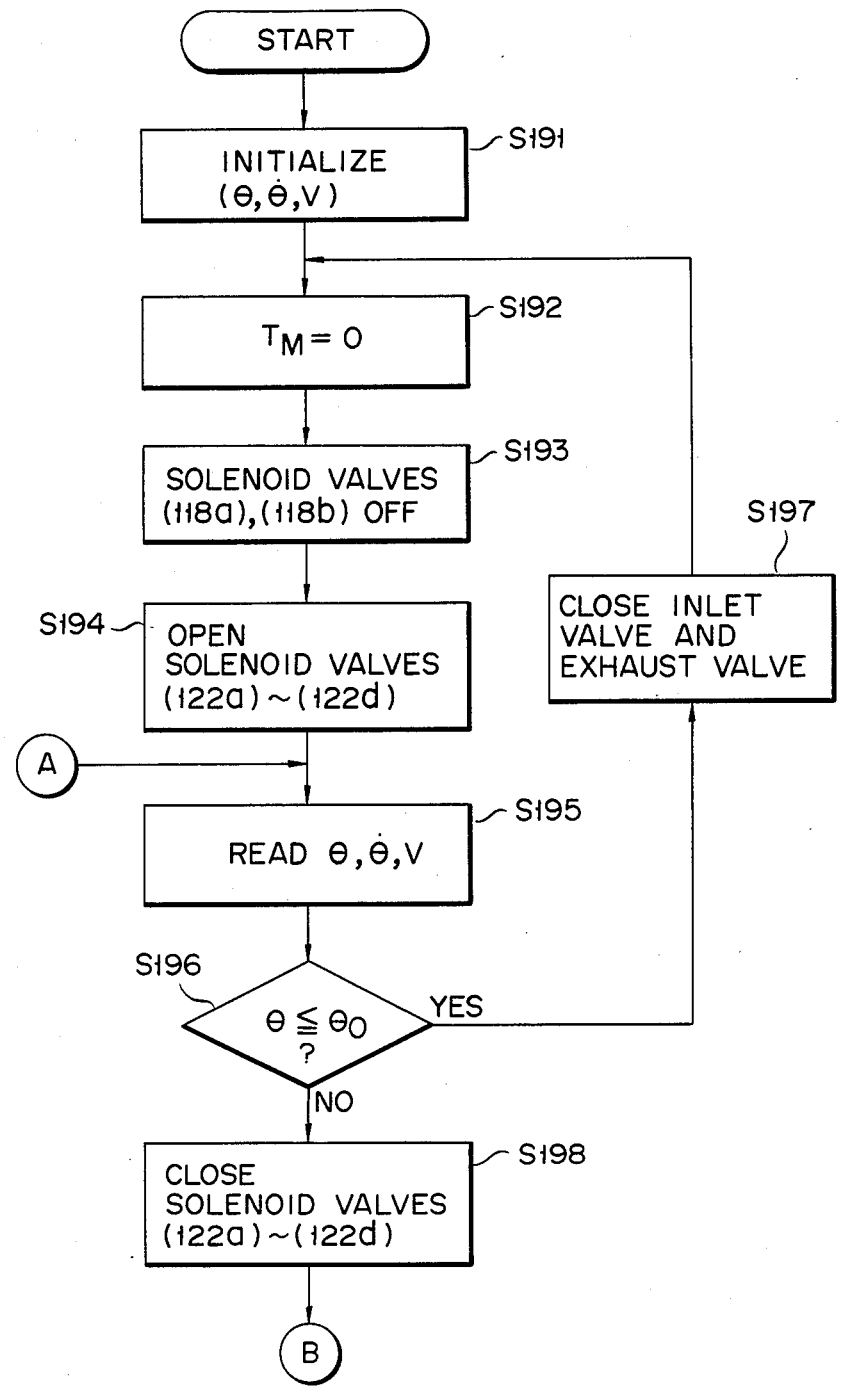
FIGS. 24A and 24B are flow charts for explaining the operation of a thirteenth embodiment of the present invention.
Figure 24B:
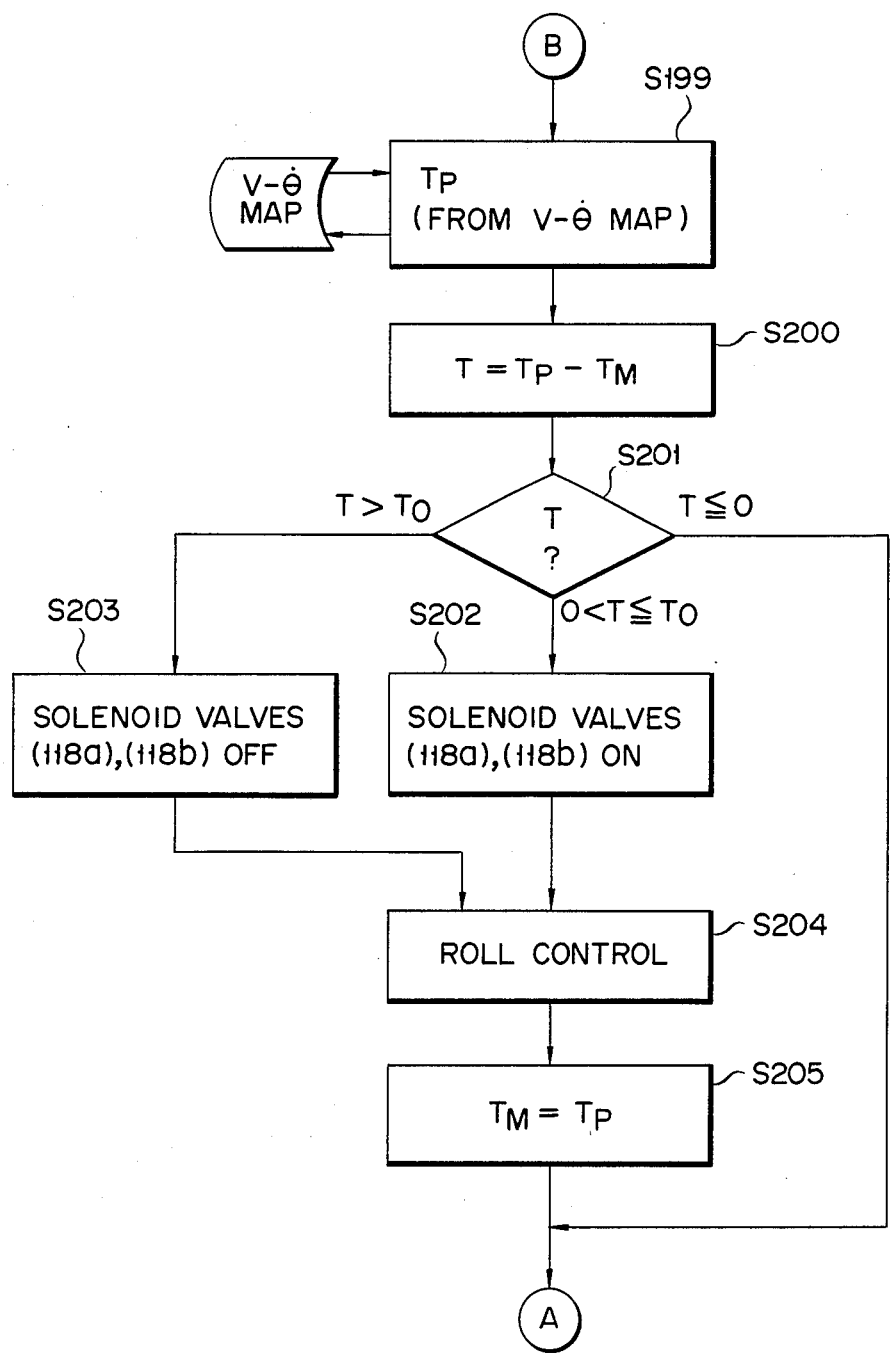

The operation of a thirteenth embodiment of the present invention will be described with reference to the flow charts of FIGS. 24A and 24B. When a driver turns on the ignition, the controller 124 performs the operation in accordance with the flow charts of FIGS. 24A and 24B. In step S191, a predetermined area of the controller 124, which stores the steering angle $\theta$, the steering angular velocity $\dot{\theta}$ and the velocity V, is cleared. In step S192, the map memory $T_M$ is reset ($T_M=0$). In step S193, large-diameter paths of the inlet path selecting solenoid valves 118a and 118b are detected by the controller 124. In step S194, the controller 124 then checks that the communicating solenoid valves 122a to 122d are open. In step S195, the steering angle $\theta$ detected by the steering sensor 130 is fetched by the controller 124. The controller 124 then calculates the steering angular velocity $\dot{\theta}$, i.e., a change in steering angle as a function of time. The velocity V detected by the velocity sensor 132 is fetched by the controller 124. The controller 124 checks in step S196 whether or not the steering angle corresponding to the neutral steering wheel position, i.e., condition $\theta \leq \theta 0$, has been established. Here the neutral position indicates that the steering wheel has not been turned clockwise or counterclockwise over the reference angle 80. If YES in step S196, the flow advances to step S197. In step S197, the controller 124 checks that the inlet solenoid valves 119a to 119d and the exhaust solenoid valves 120a to 120d are closed. However, if these valves are not closed, they are closed under the control of the controller 124.

However, if NO in step S196, the roll control is started after step S198. In step S198, the communicating solenoid valves 122a to 122d are closed under the control of the controller 124. In step S199, a control time $T_P$ is calculated in accordance with the V$-\dot{\theta}$ map of FIG. 3 by using the steering angular velocity $\dot{\theta}$ and the velocity V. This control time $T_P$ (T0' to T6') is determined in accordance with the regions I to VII of the V$-\dot{\theta}$ map of FIG. 3, and is represented in parentheses. Thereafter, the flow advances to step S200, and a control time T ($=T_P-T_M$) is calculated. The controller 124 checks in step S201 whether the condition T>TO, 0<T$\leq$TO or T$\leq$0 has been established. If the controller 124 determines that condition T$\leq$0 has been established, the flow returns to step S195. In this case, roll control is not performed. When the controller 124 determines that condition 0<T$\leq$TO has been established in step S201, the flow advances to step S202. In step S202, the inlet path selecting solenoids 118a and 118b are driven by the controller 124 to close the large-diameter paths, so that only the small-diameter paths thereof are open. However, when the controller 124 determines in step S201 that condition T>TO has been established, the flow advances to step S203. In step S203, the controller 124 checks that the large-diameter paths of the inlet path selecting solenoid valves 118a and 118b are open. Therefore, the large and small-diameter paths are opened to supply a large amount of compressed air per unit time.

When the operation in step S202 or S203 has been completed, the flow advances to step S204. The inlet solenoid valves 119a to 119d and the exhaust solenoid valves 120a to 120d are opened for the control time T calculated in step S200, thereby performing roll control. For example, when the steering wheel is turned clockwise, the left wheel inlet solenoid valves 119b and 119d are opened for the control time T to supply the compressed air to the main air spring chambers 111b and 111d under the control of the controller 124. In this case, the left suspension units $S_{FL}$ and $S_{RL}$ are biased to increase the left vehicle height. At the same time, the right wheel exhaust solenoid valves 120a and 120c are opened for the control time T to exhaust the compressed air from the main air spring chambers 111a and 111c, thereby biasing the right suspension units $S_{FR}$ and $S_{RR}$ to decrease the right vehicle height. Therefore, when the steering wheel is turned clockwise, the left vehicle height will not be decreased, and the right vehicle wheel will not be increased, thereby maintaining the vehicle body in a horizontal position.

As mentioned above, the inlet path selecting solenoid valves 118a and 118b are operated under the control of the controller 124 for the control time T. In normal turning having a low velocity or a small steering angle, a small amount of compressed air per unit time is supplied to the corresponding main air spring chambers to perform slow roll control. However, in rapid turning, a large amount of compressed air per unit time is supplied to the corresponding main air spring chamber to perform high-speed roll control.

When the operation is step S204 has been completed, the flow advances to step S205 wherein the map memory is updated, i.e., let $T_M$ be $T_P$.

In this manner, normal or rapid turning of the vehicle body corresponds to the length of the control time given by the V$-\dot{\theta}$ map. In normal turning having low velocity or a small steering angle, a small amount of compressed air per unit time is supplied to the corresponding main air spring chambers to perform moderate roll control. However, in rapid turning, a large amount of compressed air per unit time is supplied to the corresponding main air spring chambers to perform high-speed roll control. Therefore, optimal roll control is thus provided wherein roll of the vehicle is reduced, which greatly improves driving stabiity.

Figure 25A:
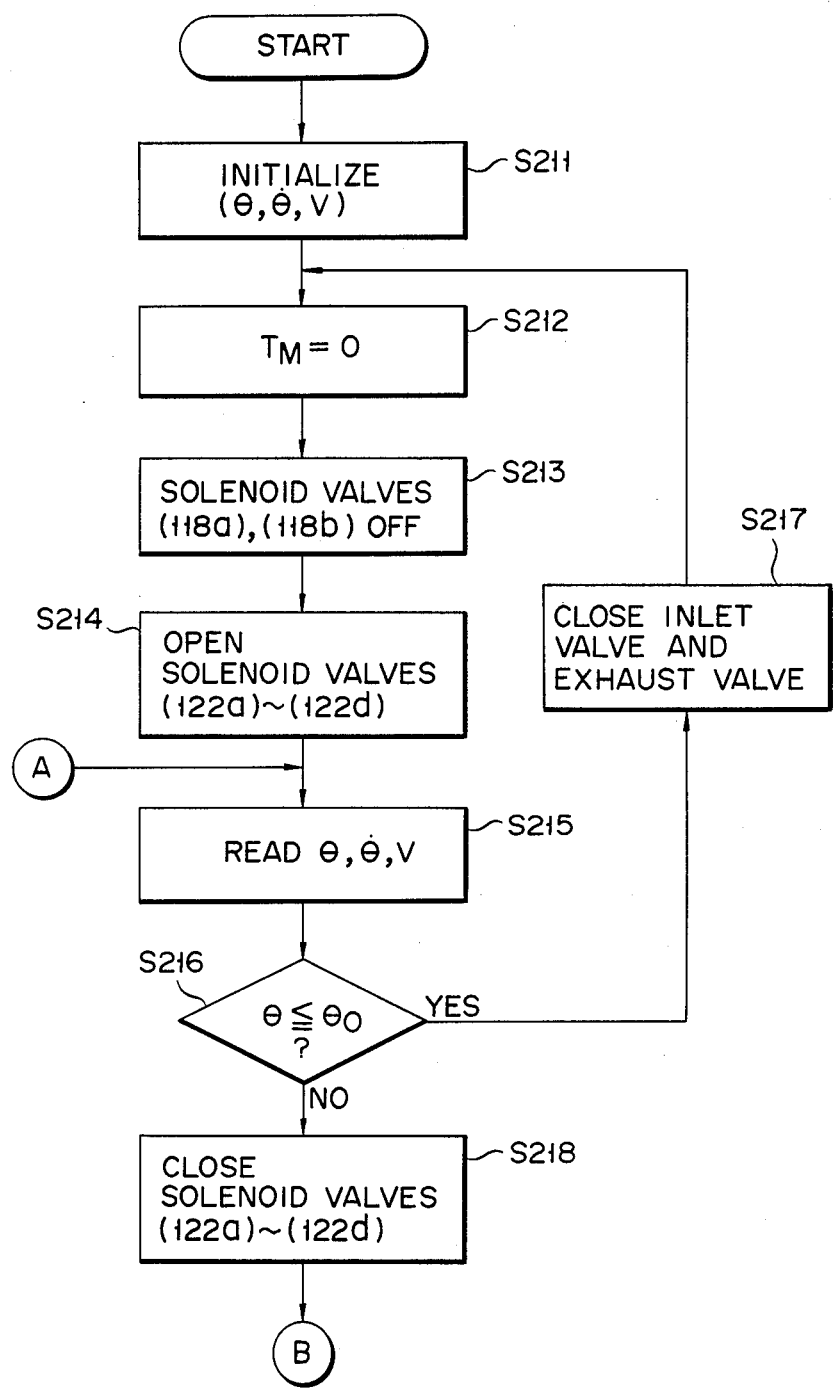

The operation of a fourteenth embodiment of the present invention will be described with reference to flow charts of FIGS. 25A and 25B. When a driver turns on the ignition, the controller 124 performs the operation in accordance with the flow charts of FIGS. 25A and 25B. In step S211, a predetermined area of the controller 124, which stores the steering angle $\theta$, the steering angular velocity $\dot{\theta}$ and the velocity V, is cleared. In step S212, the map memory $T_M$ is reset ($T_M=0$). In step S213, the large-diameter paths of the inlet path selecting solenoid valves 118a and 118b are checked by the controller 124. In step S214, the controller 124 then checks that the communicating solenoid valves 122a to 122d are open. However, if these valves are not opened, they are opened under the control of the controller 124. In step S215, the steering angle $\theta$ detected by the steering sensor 130 is fetched by the controller 124. The controller 124 then calculates the steering angular velocity $\dot{\theta}$, i.e., a change in steering angle as a function of time. The velocity V detected by the velocity sensor 132 is fetched by the controller 124. The controller 124 checks in step S216 whether or not the steering angle corresponding to the neutral steering wheel position, i.e., condition $\theta \leq \theta 0$, has been established. Here the neutral position indicates that the steering wheel has not been turned clockwise or counterclockwise over the reference angle $\theta 0$. If YES in step S216, the flow advances to step S217. In step S217, the controller 124 checks that the inlet solenoid valves 119a to 119d and the exhaust solenoid valves 120a to 120d are closed. However, if these valves are not closed, they are closed under the control of the controller 124.

However, if NO in step S216, roll control is started after step S218. In step S218, the communicating solenoid valves 122a to 122d are closed under the control of the controller 124. The controller 124 checks in step S219 whether or not the steering angular velocity $\dot{\theta}$ is equal to or larger than the reference steering angular velocity. If NO in step S219, the flow advanes to step S220. In step S220, the large-diameter paths of the inlet path selecting solenoid valves 118a and 118b are closed under the control of the controller 124, so that only the small-diameter paths are open. In step S221, a control time $T_P$ is calculated in accordance with the $V-\theta$ map of FIG. 8 by using the steering angle $\theta$ and the velocity V. This control time $T_P$ is determined in accordance with the regions I to VII of the $V-\theta$ map of FIG. 8, and is represented in parentheses.

However, if YES in step S219, the flow advances to step S222. In step S222, the controller 124 check the large-diameter paths of the inlet path selecting solenoid valves 118a and 118b, so that both the large- and small-diameter paths are opened. In step S223, a control time $T_P$ (i.e., a time or opening the solenoid valve) is calculated in accordance with the $V-\dot{\theta}$ map of FIG. 3 by using the steering angular velocity $\dot{\theta}$ and the velocity V. This control time $T_P$ is determined in accordance with the regions I to VII of the $V-\dot{\theta}$ map of FIG. 3, and is represented in parentheses. When the operation in step S220, S221 or steps S222 and S223 has been completed, the flow advances to step S224 wherein a control time $T(=T_P-T_M)$ is calculated. The controller then checks in step S225 whether or not condition $T>0$ has been established. If NO in step S225, the flow returns to step S215. In this case, the roll control is not performed. However, if YES in step S225, the flow advances to step S226. In this step, the inlet solenoid valves 119a to 119d and the exhaust solenoid valves 120a to 120d are opened for the control time T to perform roll control. For example, when the steering wheel is turned clockwise, the left wheel inlet solenoid valves 119b and 119d are opened for the control time T to supply the compressed air to the main air spring chambers 111b and 111d under the control of the controller 124. In this case, the left suspension units $S_{FL}$ and $S_{RL}$ are biased to increase the left height. Subsequently, the right wheel exhaust solenoid valves 120a and 120c are opened for the control time to exhaust the compressed air from the right wheel main air spring chambers 111a and 111c under the control of the controller 124, thereby biasing the right suspension units $S_{FR}$ and $S_{RR}$ to decrease the right height. Therefore, when the steering wheel is turned clockwise, the left height will not be decreased, and the right vehicle height will not be increased, so that the vehicle body is maintained horizontal.

In this case, two types of paths of the inlet path selecting solenoid valves 118a and 118b are selectively determined. In normal turning, a relatively small amount of compressed air per unit time is supplied to the corresponding main air spring chambers to provide relatively slow roll control. However, in rapid turning, a large amount of compressed air per unit time is supplied to the corresponding air spring chambers, thereby providing high-speed roll control.

When the operation in step S226 has been completed, the flow advances to step S227 wherein the map memory is updated, i.e., let $T_M$ be $T_P$.

In this manner, normal or rapid turning is detected in accordance with whether or not the steering angular velocity $\dot{\theta}$ is equal to or larger than the reference angular velocity. In normal turning, the amount of compressed air per unit time supplied to the corresponding main air spring chambers is decreased in accordance with the control time given by the $V-\theta$ map thereby providing slow roll control. However in rapid turning, the amount of compressed air per unit time is increased in accordance with the control time T given by the $V-\dot{\theta}$ map, thereby providing high-speed roll control. Therefore, optimal roll control can be provided in both normal and rapid turning, and roll of the vehicle body can be reduced to greatly improve driving stability.

In the first to fourteenth embodiments, air is used as a working fluid. However, the working fluid may comprise another safe and controllable fluid.

In the above embodiments, the present invention is applied to a suspension apparatus using an air spring utilizing air (gas). However, the present invention may also be applied to a hydropneumatic type suspension apparatus using a gas and a liquid.

What is claimed is:

1. A suspension apparatus comprising:
   suspension units mounted on respective wheels, each unit having a fluid spring chamber;
   fluid supply means for supplying a fluid to each fluid spring chamber through a fluid supply valve;
   fluid exhaust means for exhausting the fluid from each fluid spring chamber through a fluid exhaust valve;
   first communicating means connecting a first communication control valve to said fluid spring chambers of the right and left front wheel suspension units;
   second communicating means connecting a second communication control valve to said fluid spring chambers of the right and left rear wheel suspension units;
   steering angle detecting means for detecting steering angle;
   velocity detecting means for detecting a vehicle velocity;
   a controller for generating a communication control signal and a roll control signal when both the steering angular velocity, which is calculated from the steering angle detected by said steering angle detecting means, and the vehicle velocity, which is detected by said velocity detecting means are higher than their prescribed levels, said first and second communication control valves being closed by said communication control signal, and said fluid supply valves in the fluid spring chambers located on the contracted side with respect to a roll direction and said fluid exhaust valves in the fluid spring chambers located on the elongated side with respect to the roll direction being open during a present control time by said roll control signal;
   said controller determining the length of a first control time in accordance with the steering angular velocity which is calculated from the steering angle detection by said steering angle detecting means and with the vehicle velocity detected by said vehicle velocity detecting means, and adopting said first control time as said preset control time;
   said controller comprising a first memory for storing a plurality of control time corresponding to the vehicle velocity and the steering angular velocity, the length of a first control time being obtained from said first memory in accordance with the detected vehicle velocity and steering angular velocity;

said controller also comprising a second memory which stores the first control time obtained from said first memory and which has a contents thereof cleared when said communication control valves are open, said controller generating a supplementary roll control signal, when a first control time newly obtained from said first memory after the outputting of said roll control signal is longer than the first control time already stored in said secon memory, for opening said fluid supply and exhaust valves for an additional period of time equal to the difference between the already stored first control time and the newly obtained first control time, and replacing the contents of said second memory with the newly obtained first control time.

2. An apparatus according to claim 1, wherein said fluid is substantially air, and said fluid supply means is provided with a compressor and tank for storing compressed air supplied from the compressor.

3. An apparatus according to claim 1, wherein said controller determines the length of a second control time in accordance with the steering angle detected by said sterring angle detecting means and with the vehicle velocity detected by said vehicle velocity detecting means, and selects one of said first and second control time as said preset control time in accordance with the driven state of the vehicle.

4. An apparatus according to claim 3, wherein said controller selects said first control time as said preset control time when the steering angular velocity detected by said steering angular velocity detecting means is equal to or larger than a preset value, and selects said second control time as said preset control time when the steering angular velocity is smaller than the preset value.

* * * * *